United States Patent
Taniguchi et al.

(10) Patent No.: US 11,641,173 B2
(45) Date of Patent: May 2, 2023

(54) CONTROL APPARATUS OF ROTARY ELECTRIC MACHINE AND METHOD THEREFOR

(71) Applicant: DENSO CORPORATION, Kariya (JP)

(72) Inventors: Makoto Taniguchi, Kariya (JP); Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 46 days.

(21) Appl. No.: 17/233,739

(22) Filed: Apr. 19, 2021

(65) Prior Publication Data

US 2021/0257950 A1    Aug. 19, 2021

Related U.S. Application Data

(63) Continuation of application No. PCT/JP2019/032379, filed on Aug. 20, 2019.

(30) Foreign Application Priority Data

Oct. 18, 2018   (JP) .............................. JP2018-196913

(51) Int. Cl.
    *H02P 27/08*     (2006.01)
    *H02P 25/22*     (2006.01)
    *H02P 29/64*     (2016.01)

(52) U.S. Cl.
    CPC ............ *H02P 25/22* (2013.01); *H02P 27/085* (2013.01); *H02P 29/64* (2016.02); *H02P 2207/055* (2013.01)

(58) Field of Classification Search
    CPC ........ H02P 25/22; H02P 27/085; H02P 29/64; H02P 2207/055; H02P 27/08
See application file for complete search history.

(56) References Cited

U.S. PATENT DOCUMENTS

| | | | |
|---|---|---|---|
| 8,638,014 B2 * | 1/2014 | Sears | ..................... H02K 9/14 310/90 |
| 9,203,339 B2 * | 12/2015 | Sato | ..................... B60L 50/15 |

(Continued)

FOREIGN PATENT DOCUMENTS

| | | |
|---|---|---|
| JP | H4-359644 A | 12/1992 |
| JP | 2012-175755 A | 9/2012 |

OTHER PUBLICATIONS

Nov. 12, 2019 International Search Report issued in International Patent Application No. PCT/JP2019/032379.

*Primary Examiner* — Rina I Duda
(74) *Attorney, Agent, or Firm* — Oliff PLC

(57) ABSTRACT

A control apparatus of a rotary electric machine includes a rotor; a stator including a multiphase stator winding provided with conductor portions arranged in a circumferential direction thereof. The rotary electric machine is configured of any one of a first configuration having a first inter-conductor member using a magnetic material; a second configuration having a second inter-conductor member using a non-magnetic material; and a third configuration having no inter-conductor member. The control apparatus includes: a drive circuit with switching elements provided for each phase, supplying power to the multiphase stator winding; and a control unit controlling the drive circuit such that a period where a conduction ratio of the switching elements for one phase in the drive circuit is maintained at a constant value is more than or equal to 120 degrees and less than 180 degrees in electrical angle.

13 Claims, 22 Drawing Sheets

(56) References Cited

U.S. PATENT DOCUMENTS

| | | | |
|---|---|---|---|
| 9,327,424 B2 * | 5/2016 | Jönsson | B23D 47/12 |
| 9,595,859 B2 * | 3/2017 | Dhawan | H02K 21/22 |
| 2009/0322264 A1 * | 12/2009 | Imura | B60L 15/025 |
| | | | 318/400.09 |
| 2010/0264863 A1 | 10/2010 | Kitagawa | |
| 2017/0294829 A1 | 10/2017 | Nakahata et al. | |

* cited by examiner

CONTROL APPARATUS OF ROTARY ELECTRIC MACHINE AND METHOD THEREFOR

CROSS REFERENCE TO RELATED APPLICATION

This application is the U.S. bypass application of International Application No. PCT/JP2019/32379 filed on Aug. 20, 2019 which designated the U.S. and claims priority to Japanese Patent Application No. 2018-196913, filed Oct. 18, 2018, the contents of both of which are incorporated herein by reference.

BACKGROUND

Technical Field

The present disclosure relates to a control apparatus of a rotary electric machine and a control method for a rotary electric machine.

Description of the Related Art

Various techniques have been proposed for a rotary electric machine in order to accomplish downsizing of the body and improve the efficiency of the rotary electric machine. For example, coreless or toothless winding motors have been proposed.

SUMMARY

The present disclosure provides a control apparatus and a control method of a rotary electric machine capable of performing stable rotation control in a rotary electric machine having a toothless winding.

A first aspect of the present disclosure is a control apparatus of a rotary electric machine including a rotor; a stator disposed co-axially with the rotor, the stator including a multiphase stator winding provided with conductor portions arranged in positions facing the rotor at predetermined intervals in a circumferential direction thereof. The rotary electric machine is provided with any one of the following configurations: a first configuration having a first inter-conductor member using a magnetic material; a second configuration having a second inter-conductor member using a non-magnetic material; and a third configuration having no inter-conductor member. The control apparatus includes: a drive circuit connected to the multiphase stator winding of the rotary electric machine, including a pair of switching elements controlling an energization state, provided for each of a corresponding one of a plurality of phases, the drive circuit supplying power to the multiphase stator winding by operating the pair of switching elements; and a control unit that controls the drive circuit such that a period where a conduction ratio of the pair of switching elements for one phase in the drive circuit is maintained at a constant value is a predetermined period larger than or equal to 120 degrees and less than 180 degrees in electrical angle.

BRIEF DESCRIPTION OF THE DRAWINGS

The foregoing and other objects, features, and advantages of the present disclosure will be more clarified by the following detailed descriptions with reference to the accompanying drawings. The drawings are as follows.

In the accompanying drawings.

DETAILED DESCRIPTION OF THE PREFERRED EMBODIMENTS

As conventional art, for example, Japanese Patent Application Laid-Open Publication No. 2012-175755 discloses a motor (i.e. rotary electric machine) having a configuration of coreless and toothless windings in order to accomplish downsizing and improve the efficiency of the rotary electric machine. Conventionally, such a toothless-winding motor is limited to a DC brush motor having relatively small capacity such as a motor used for a model. However, according to the invention of the above-described patent literature, a toothless winding is applied to a large-sized motor.

Since a large-sized motor requires a large amount of current and a high voltage with a result that long-life brush material and a large sized body are required, a so-called AC brushless motor is required. The brushless motor needs to be energized with an appropriate current depending on the magnetic pole position of the rotor. Hence, precise sinusoidal PWM (i.e. pulse width modulation) control is utilized by a drive circuit with an inverter circuit to drive the brushless motor by performing a feedback control of the current.

According to the PWM control, an inductance component of the winding, that is, primary delay characteristics of the current, are used to continuously apply the pulse voltage to control the current value, thereby approximating a continuous sinusoid wave current.

Further, Japanese Patent Application Laid-Open Publication No. 2016-092982 discloses a voltage conversion apparatus in which a SiC device or a GaN device is used, and these switching devices are driven at 1 MHz frequency to accomplish high speed switching compared to a Si device.

Figure 23A:
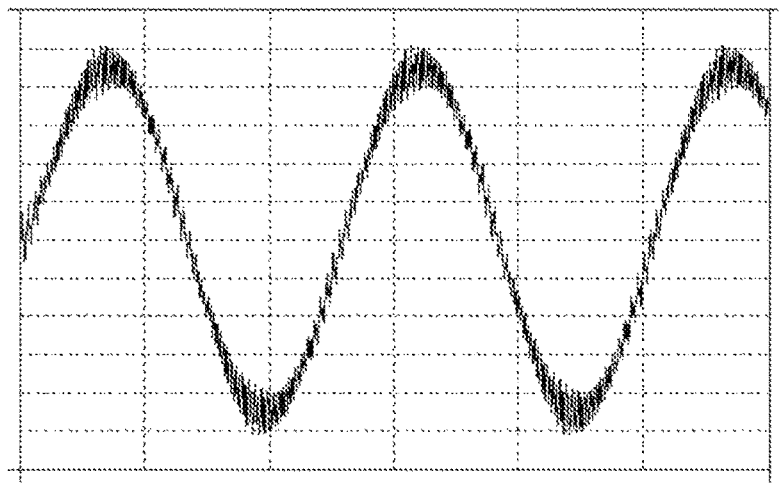
FIG. 23A is a diagram showing a current waveform when sinusoidal PWM control using a switching frequency of 10 KHz is applied.

However, since the toothless winding according to Japanese Patent Application Laid-Open Publication No. 2016-092982 has significantly small inductance of the winding due to the configuration having no core and primary delay characteristics being very small, the current significantly changes when performing PWM control with a switching frequency lower than or equal to 10 KHz (FIG. 23A).

According to a configuration disclosed by Japanese Patent Application Laid-Open Publication No. 2016-092982, current variation may be suppressed since a frequency of 1 MHz is used. However, a current detecting capability when executing a successive current feedback control to supply a sinusoidal current, that is, A to D conversion speed, is insufficient to follow the high-speed switching.

Generally, the resolution and the sampling rate of the A/D conversion have a trade-off relationship such that the higher the sampling rate for high-speed switching, the lower the resolution. Hence, A/D conversion is difficult to apply for a motor having large current capacity.

In order to avoid this situation, current detection may be only performed every few pulses, but this lowers the sampling rate. As a result, the current waveform is distorted causing vibration noise.

Alternatively, the number of turns of the winding can be considered since the inductance of the winding is proportional to the square of the number of turns of the winding. However, the winding resistance becomes larger which causes increasing in size of the apparatus.

In this respect, a calculation unit having high processing capability may be utilized to solve the above-described problems. However, commercially, it is difficult to achieve.

With reference to the drawings, embodiments of the present disclosure will be described.

First Embodiment

Hereinafter, with reference to the drawings, a first embodiment will be described. A rotary electric machine according to the present embodiment is utilized for, for example, a vehicle power source. However, the rotary electric machine is widely used for industrial uses, vehicles, home electrical appliances, office automation equipment, or game machines. In the following embodiments, the same reference numbers are applied to mutually the same or equivalent portions, and repeated explanation is omitted for portions having the same reference number.

Figure 1:
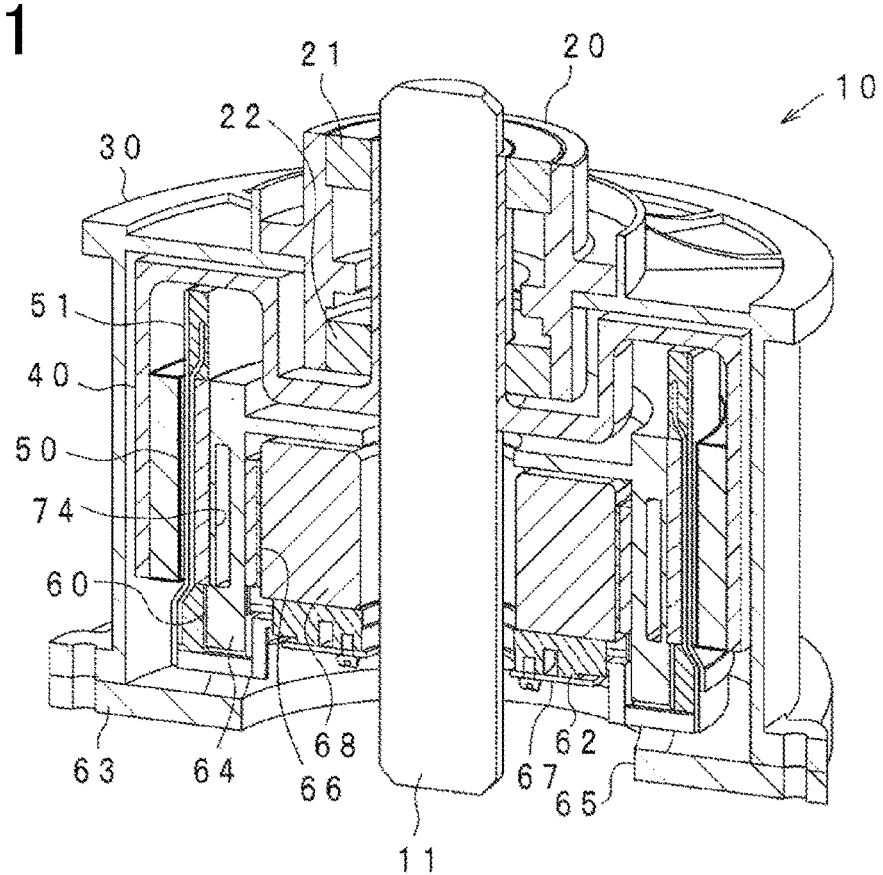
FIG. 1 is a diagram showing a perspective view of a vertical cross-section according to a first embodiment of the present disclosure.
Figure 2:
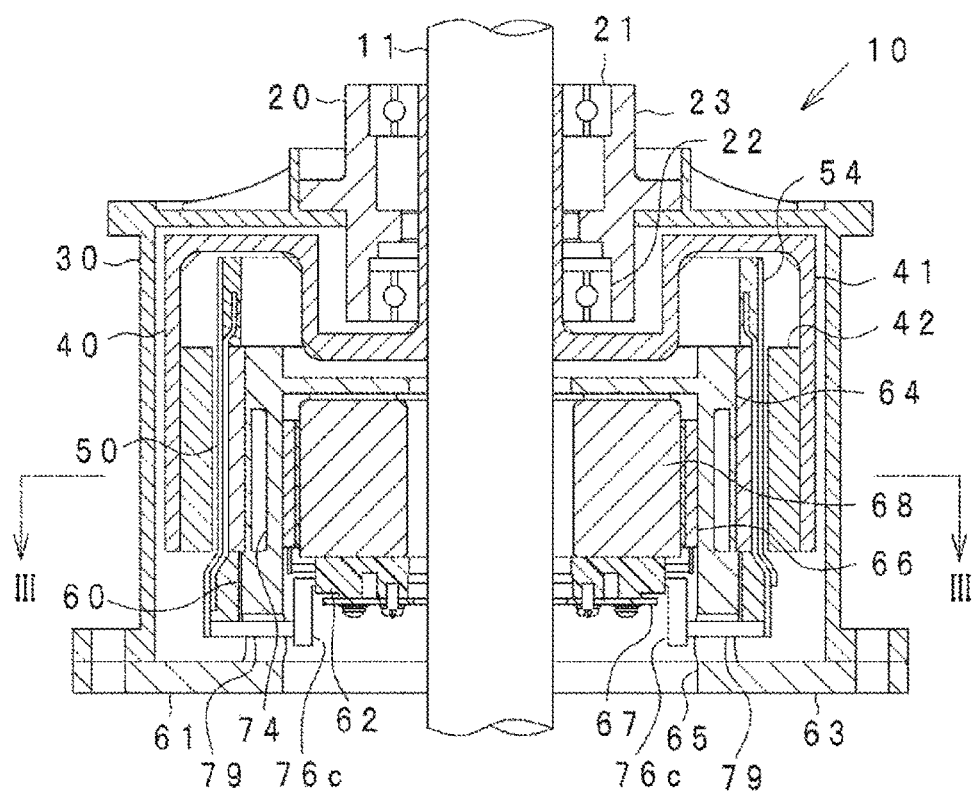
FIG. 2 is a diagram showing a vertical cross-sectional view of a rotary electric machine.
Figure 3:
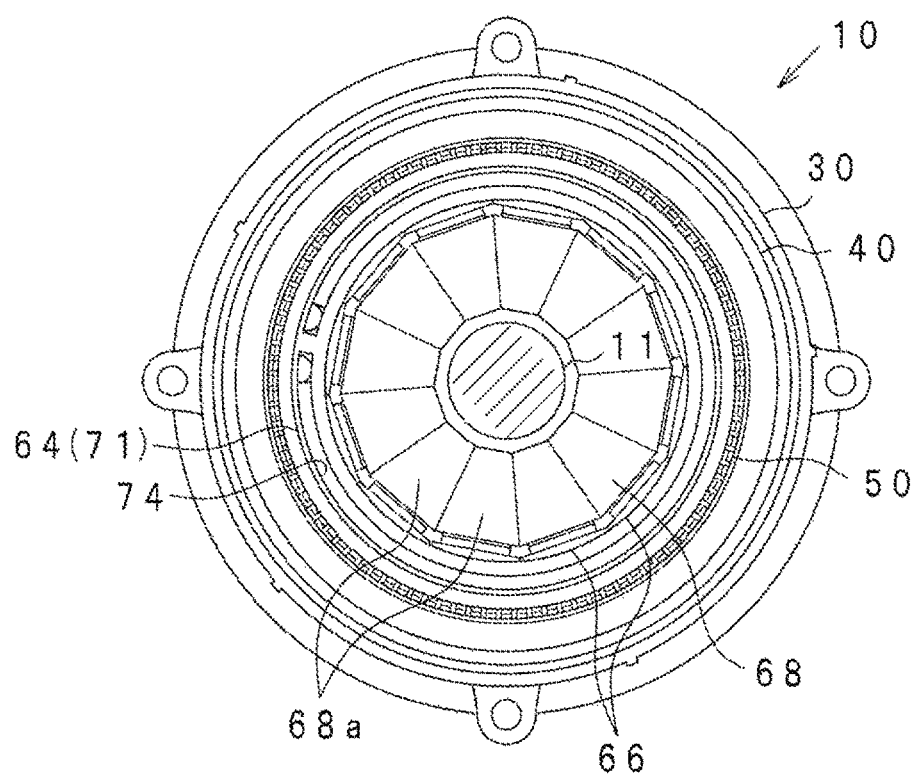
FIG. 3 is a diagram showing a cross-sectional view taken across a line III-III of FIG. 2.
Figure 4:
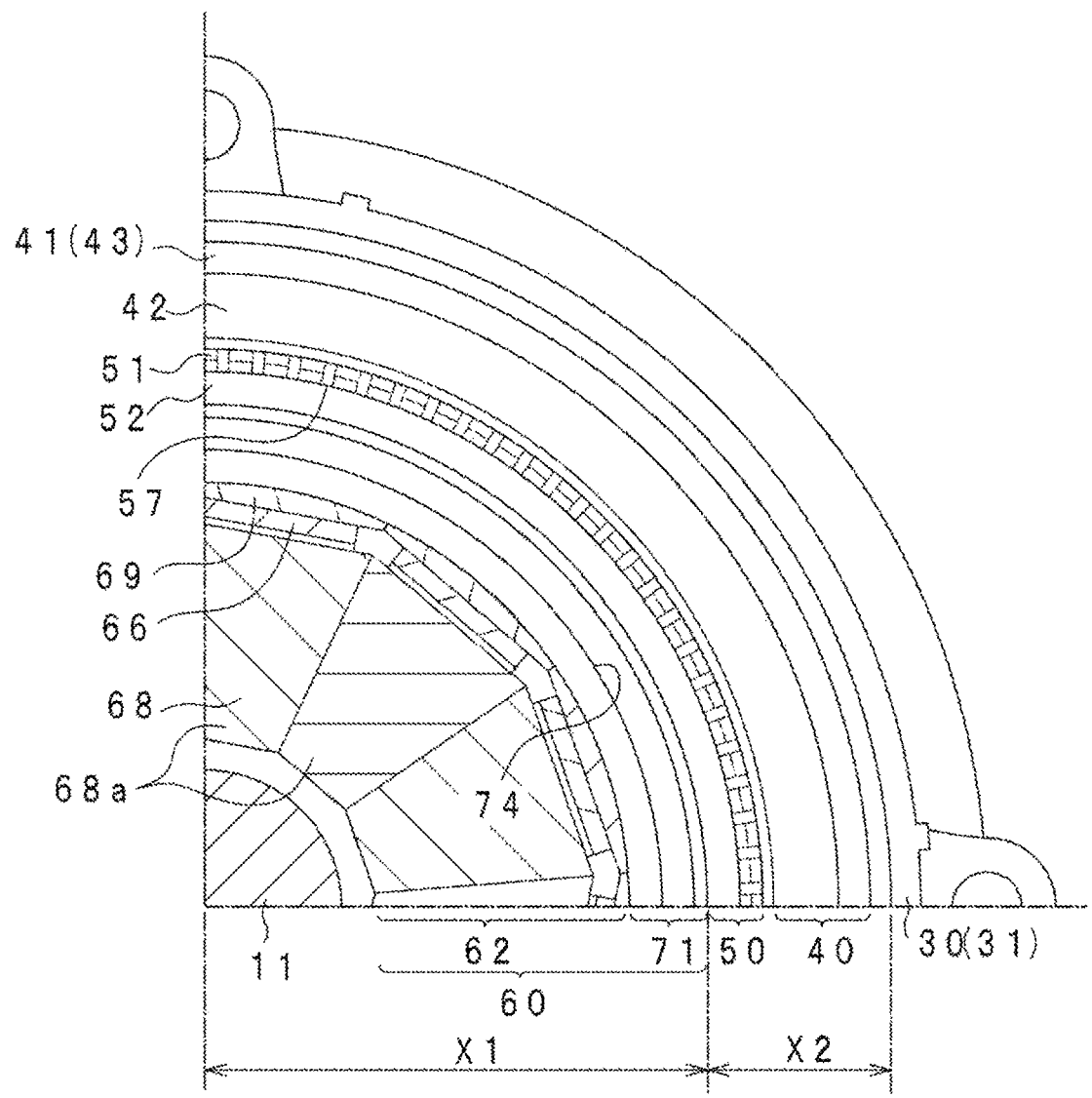
FIG. 4 is a diagram showing a cross sectional view in which a part of FIG. 3 is enlarged.
Figure 5:
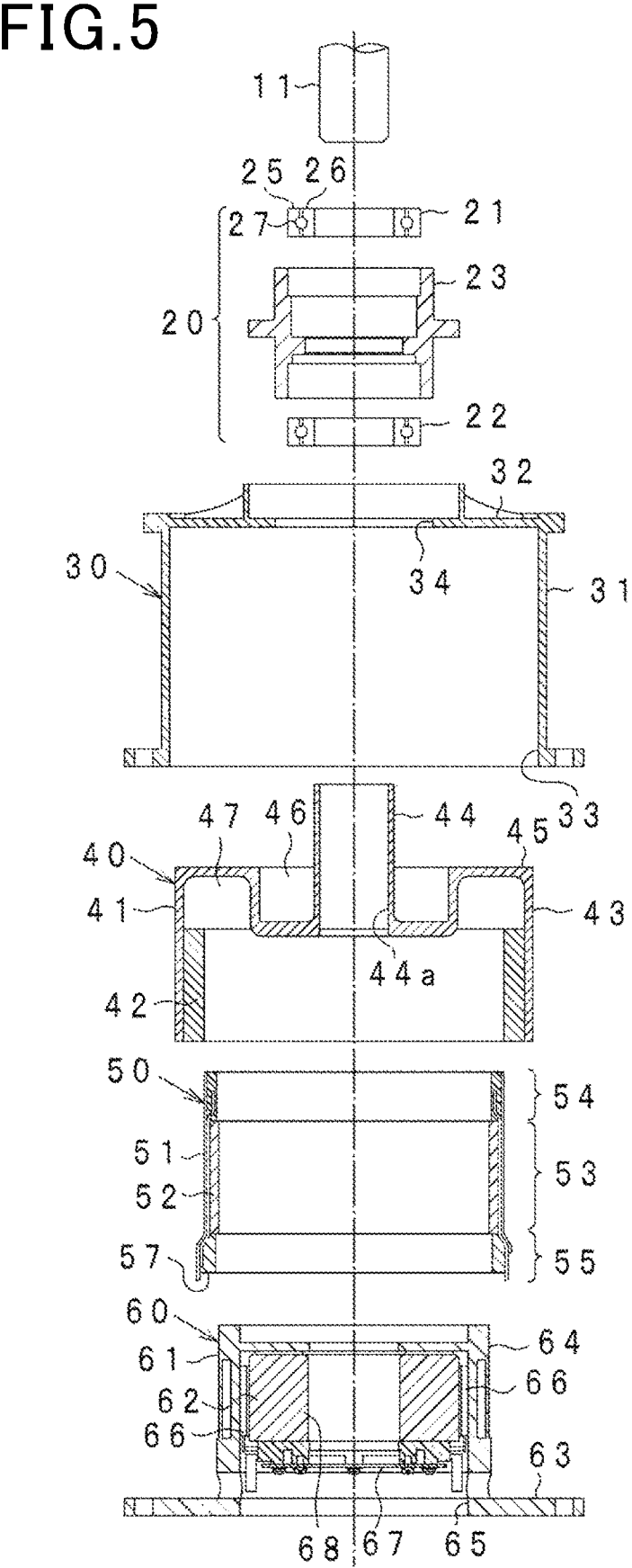
FIG. 5 is a diagram showing an exploded view of a rotary electric machine.

A rotary electric machine 10 according to the present embodiment is a synchronous multiphase AC motor having an outer rotor structure (eversion structure). An outline of the rotary electric machine 10 will be shown in FIGS. 1 to 5. FIG. 1 is a perspective view of a vertical cross-section of the rotary electric machine 10, FIG. 2 is a vertical cross-sectional view of the rotary electric machine 10 sectioned along the rotary axis 11 of the rotary electric machine 10, FIG. 3 is a transverse cross-sectional view of the rotary electric machine 10 sectioned along a direction orthogonal to the rotary axis 11 (cross sectional view across line III-III in FIG. 2), FIG. 4 is a cross-sectional view in which a part of FIG. 3 is enlarged, FIG. 5 is an exploded view of the rotary electric machine. In FIG. 3, for convenience of illustration, hatching showing the cut section is omitted except for the rotary shaft 11. In the following description, a direction where the rotary shaft 11 extends is defined as an axial direction, a direction radially extending from the center of the rotary axis 11 is defined as a radial direction and a direction circumferentially extending around the rotary shaft 11 as the center thereof is defined as a circumferential direction.

The rotary electric machine 10 is mainly provided with a bearing part 20, a housing 30, a rotor 40, a stator 50 and an inverter unit 60. The respective members are disposed together coaxially on the rotary shaft 11 and assembled in the axial direction with a predetermined order to constitute the rotary electric machine 10.

The bearing part 20 includes bearings 21 and 22, a supporting member 23 that supports the bearing 21 and 22. The bearings 21 and 22 are each configured as, for example, a radial ball bearing including an outer ring 25 and an inner ring 26 and a plurality of balls 27 arranged between the outer ring 25 and the inner ring 26. The supporting member 23 has a cylindrical shape in which the bearings 21 and 22 are assembled in a radially inside portion. Then, the rotary shaft 11 and the rotor 40 are rotatably supported in the radially inside portion.

The housing 30 includes a peripheral wall 31 having a cylindrical shape and an end face 32 provided at either one end between both axial ends of the peripheral wall 31. An opposite side of the end face 32 in both axial ends of the peripheral wall 31 is configured as an opening 33. The housing 30 is configured such that the opposite side of the end face 32 is entirely opened by the opening 33. In the end face 32, a hole 34 having circular shape is formed in the center thereof. The bearing part 20 is fixed by a fixing member such as a screw and a rivet in a state of being inserted through the hole 34. Further, the rotor 40 and the stator 50 are accommodated inside the housing 30, that is, an inner space divided by the peripheral wall 31 and the end face 32. According to the present embodiment, the rotary electric machine 10 is configured as an outer rotor type, and in the housing 30, the stator 50 is disposed radially inside the cylindrical rotor 40. The rotor 40 is cantilevered by the rotary shaft 11 in a portion of the end face 32 in the axial direction.

The rotor 40 includes a rotor body 41 formed to have a hollow cylindrical shape and a magnet portion 42 having an annular shape provided radially inside the rotor body 41. The rotor body 41 is formed in a substantial cup shape and has a function of a magnet supporting member. The rotor body 41 has a magnet supporting portion 43 having a cylindrical shape, a fixing portion 44 having the same cylindrical shape and having a diameter smaller than that of the magnet supporting portion 43 and an intermediate portion 45 serving as a portion connecting the magnet supporting portion 43 and the fixing portion 44. The magnet portion 42 is attached to an inner peripheral surface of the magnet supporting portion 43.

The rotary shaft 11 is inserted through a through hole 44a of the fixing portion 44, and in this insertion state, the fixing portion 44 is fixed to the rotary shaft 11. In other words, the rotor body 41 is fixed to the rotary shaft 41 by the fixing portion 44. Note that the fixing portion 44 may be fixed to the rotary shaft 11 by a spline coupling using a convex-concave structure, key coupling, welding or caulking. Thus, the rotor 40 rotates integrally with the rotary shaft 11.

Further, the bearings 21 and 22 of the bearing part 20 are attached to a portion radially outside the fixing portion 44. As described above, since the bearing part 20 is fixed to the end face 32 of the housing 30, the rotary shaft 30 and the rotor 40 are rotatably supported by the housing 30. Thus, the rotor 40 is rotatable in the housing 30.

For the rotor 40, the fixing portion 44 is provided at only one of the axial end side portions. Thus, the rotor 40 is cantilevered by the rotary shaft 11. Here, the fixing portion 44 of the rotor 40 is rotatably supported by the bearing 21 and 22 of the bearing part 20 at two different positions in the axial direction. In other words, the rotor 40 is rotatably supported at one side of the rotor body 41 between both ends in the axial direction by the bearings 21 and 22 at the two positions in the axial direction. Hence, even in the case where the rotor 40 has a structure of being cantilevered by the rotary shaft 11, stable rotation of the rotor 40 is accomplished. In this case, the rotor 40 is supported by the bearings 21 and 22 at positions shifted towards one side relative to the center position in the axial direction of the rotor 40.

In the bearing part 20, the bearing 22 positioned closer to the center of the rotor 40 (lower side in the drawing) and the bearing 21 on the opposite side (upper side in the drawing) differ in the dimension of a gap between the ball 27, and the outer ring 25 and the inner ring 26. For example, the bearing 22 closer to the center of the rotor 40 has a larger dimension of the gap than that of the bearing 21 in the opposite side. In this case, even when a displacement of the rotor 40 or a vibration caused by an imbalance between parts due to component tolerance influences the bearing part 20 in a portion closer to the center of the rotor 40, the influence of the displacement or the vibration can be appropriately eliminated. Specifically, since a margin of the dimension (gap dimension) of the bearing 22 positioned close to the center of the rotor 40 (lower side in the drawing) is set to be larger by a preload, vibration occurring in the cantilevered structure is absorbed by a portion where the margin of the dimension is set. The preload may be a fixed position preload. Alternatively, the preload may be given by inserting a preload spring or wave washer into a step of the bearing 22 at the outside in the axial direction.

Also, the intermediate portion 45 is configured to have a step in the axial direction between the center side in the radial direction and its outside portion. In this case, in the intermediate portion 45, the inner end portion and the outer end portion in the radial direction differ in position in the axial direction. Thus, the magnet supporting portion 43 and the fixing portion 44 are partly overlapped in the axial direction. In other words, the magnet supporting portion 43 is protruded further towards an upper side in the axial direction than the base end portion (bottom side edge in lower side of the drawing) of the fixing portion 44 is. According to the present embodiment, compared to a case where the intermediate portion is provided in a plate-like form without a step, the rotor 40 can be supported relative to the rotary shaft 11 at a portion close to the center of balance of the rotor 40. Hence, stable operation of the rotor 40 can be accomplished.

According to the configuration of the above-described intermediate portion 45, for the rotor 40, a bearing accommodating concave portion 46 which accommodates a part of the bearing part 20 is formed having an annular shape at a portion positioned inward of the intermediate portion 45 surrounding the fixing portion in the radial direction, and a coil accommodating concave portion 47 which accommodates a coil end portion 54 of a stator winding 51 in the stator 50 (described later) is formed at a portion positioned outward of the intermediate portion 45 surrounding the bearing accommodating concave portion 46 in the radial direction. Then, these respective concave portions 46 and 47 are arranged to be adjacent inward and outward in the radial direction. In other words, a part of the bearing part 20 and the coil end portion 54 are arranged to be overlapped inward and outward in the radial direction. Thus, the length (dimension) of the rotary electric machine 10 in the axial direction can be shortened.

The coil end portion 54 is bent inward or outward in the radial direction, whereby the dimension in the axial direction of the coil end portion 54 can be shortened and the length of the stator shaft can be shortened. The direction along which the coil end portion 54 is bent may take assembly with the rotor into consideration. In the case where the stator 50 is attached to the rotor 40 inside in the radial direction, the coil end portion 54 may be bent inward in the radial direction in the tip end side of the rotor 40 where the stator 50 is inserted. The bending direction in the opposite side may be any direction, but may preferably be bent outward where spatial allowance is present when considering manufacturing.

Also, the magnet portion 42 is configured of a plurality of magnets arranged radially inward of the magnet supporting portion 43 such that magnet poles are alternately changed along the circumferential direction. The magnet portion will be detailed later.

The stator 50 is provided radially inside the rotor 40. The stator 50 is provided with a stator winding 51 formed by winding in a substantially cylindrical shape and a stator core 52 disposed radially inside the stator wining 51. The stator winding 51 is disposed to face the magnet portion 42 having an annular shape via a predetermined air gap. The stator winding 51 is configured of a plurality of phase windings. These respective windings are constituted such that a plurality of wirings arranged in the circumferential direction are mutually connected at a predetermined pitch. According to the present embodiment, a three-phase winding of U, V, W phases and a three-phase winding of X, Y, Z phase are used to constitute the stator winding 51 having a 6-phase phase winding. The stator winding 51 is sealed by a sealing member 57 which is an insulation member made of synthetic resin material as a sealing member.

The stator core 52 is composed of laminated steel plates made of soft magnetic material and formed in an annular shape, having a hollow cylindrical shape. The stator 52 is attached to a portion radially inside the stator winding 51.

The stator winding 51 overlaps the stator core 52 in the axial direction, and includes a coil side portion 53 positioned radially outside of the stator core 52 and the coil end portions 54, 55 respectively extending towards one end side and the other end side of the stator core 52 in the axial direction. The coil side portion 53 faces the stator core 52 and the magnet portion 42 of the rotor 40 in the radial direction. In a state where the stator 50 is disposed inside the rotor 40, the coil end portion 54 positioned at the bearing part 20 side between the coil end portions 54 and 55 in the both sides in the axial direction, is accommodated in the coil accommodating concave portion 47 formed by the rotor body 41 of the rotor 40. The stator 50 will be detailed later.

The inverter unit 60 is provided with a unit base 61 fixed to the housing 30 by a fastening member such as a bolt, and an electrical component 62 attached to the unit base 61. The unit base 61 is provided with an end plate portion 63 fixed to an end portion of the housing 30 in an opening 33 side, and a casing portion 64 provided together with the end plate portion 63, extending in the axial direction. The end plate portion 63 has an opening 65 having a circular shape in the center thereof. The casing portion 64 is formed standing from a peripheral edge of the opening 65.

The stator 50 is attached to an outer peripheral surface of the casing 64. Specifically, the outer diameter of the casing portion 64 is the same as the inner diameter of the stator core 52 or slightly smaller than the inner diameter of the stator core 52. The stator core 52 is attached to an outside of the casing 64, whereby the stator 50 and the unit base 61 are integrated. Further, the unit base 61 is fixed to the housing 30, and the stator 50 is integrated with the housing 30 in a state where the casing portion 54 is attached to the stator core 52.

Further, a radially inside portion of the casing 64 serves as an accommodation space for accommodating the electrical component 62. In the accommodation space, the electrical component 62 is disposed to surround the rotary shaft 11. The casing portion 64 serves as an accommodation space forming portion. The electrical component 62 is configured to have a semiconductor module 66 constituting an inverter circuit, a control board 67 and a capacitor module 68.

Figure 6:
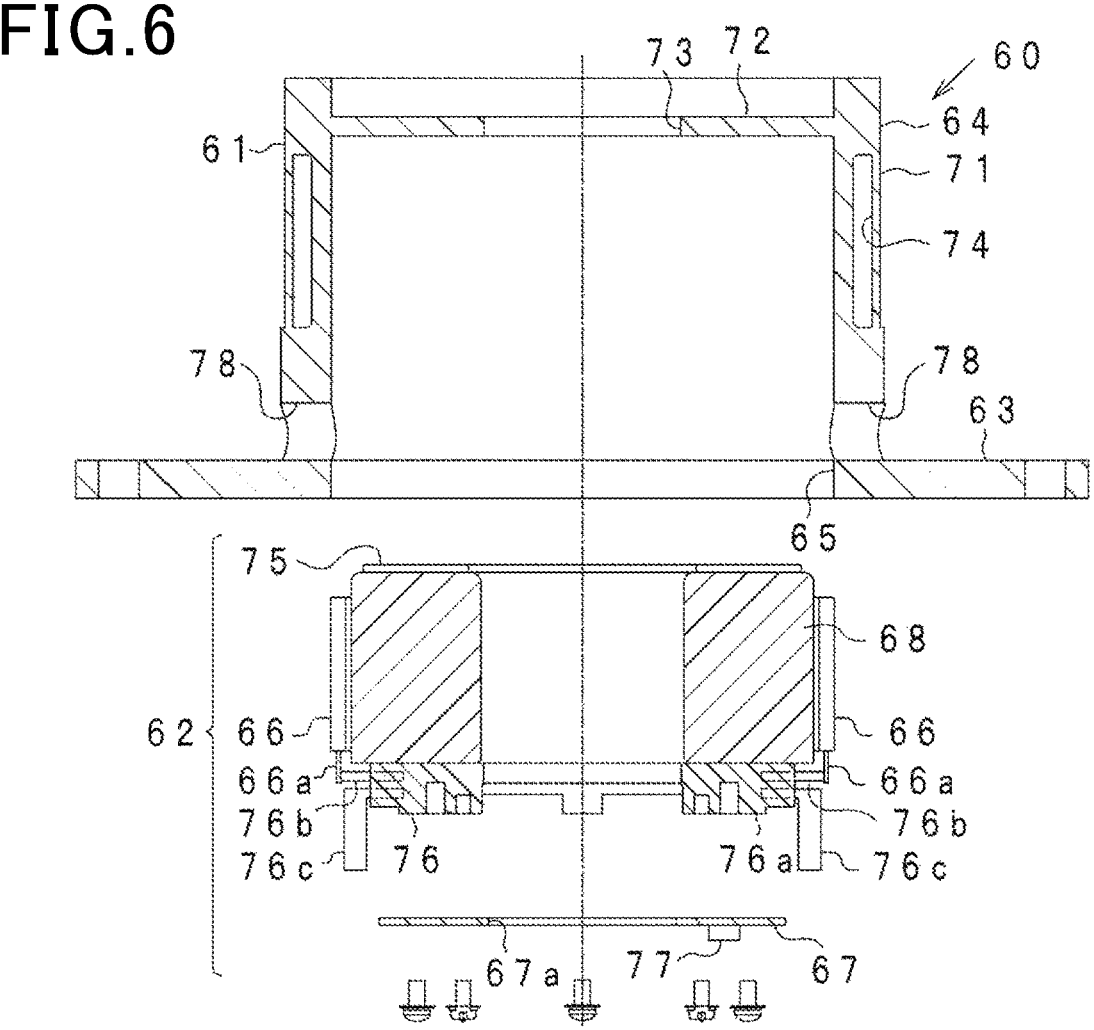
FIG. 6 is a diagram showing an exploded view of an inverter unit.

Here, with reference to FIG. 6 which is an exploded view of the inverter unit 60 in addition to the above FIGS. 1 to 5, the configuration of the inverter unit 60 will be described in more detail.

In the unit base 61, the casing portion 64 includes a cylindrical portion 71 and an end face portion 72 provided at one axial end (end portion in the bearing part 20) of the cylindrical portion 71. An opposite side of the end face 72 in both axial ends of the cylindrical portion 71 is entirely opened through the opening 65 of the end plate portion 63. In the end face portion 72, a circular hole 73 is formed at the center thereof, and the rotary shaft 11 can be inserted through the circular hole 73.

The cylindrical portion 71 of the casing 64 serves as a partitioning wall that partitions between the rotor 40 and the stator 50 disposed radially outside thereof, and the electrical component 62 disposed radially inside thereof. The rotor 40 and the stator 50, and the electrical component 62 are arranged radially inward and outward in the radial direction via the cylindrical portion 71.

The electrical component 62 is an electrical part that constitutes the inverter circuit, having a power running function in which current is applied to respective phase windings of the stator winding 51 with a predetermined order to rotate the rotor 40 and a power generation function in which three-phase AC current that flows through the stator winding 51 accompanied by rotation of the rotary shaft 11 is externally supplied as generation power. Note that the electrical component 62 may have either the power running function or the power generation function. The power generation function, when the rotary electric machine 10 is used as a vehicle power source, is a regeneration function that externally outputs the regenerated power.

As a specific configuration of the electrical component 62, the capacitor module 68 having a hollow cylindrical shape is provided around the rotary shaft 11, and a plurality of semiconductor modules 66 are arranged in the circumferential direction on the outer peripheral surface of the capacitor module 68. The capacitor module 68 is provided with a plurality of smoothing capacitors 68a mutually connected in parallel. Specifically, each capacitor 68a is configured as a laminate type film capacitor in which a plurality of film capacitors are laminated and its transverse cross section has a trapezoidal shape. The capacitor module 68 is configured of 12 capacitors 68a arranged annularly.

In a manufacturing process of the capacitor 68a, for example, a long film having a predetermined width is used in which a plurality of films are laminated, the long film is cut in an isosceles trapezoid shape, where the height direction of the trapezoid is defined as a width direction of the film, such that an upper base part and a lower bottom part of the trapezoid are alternated, thereby producing a capacitor element. Then, electrodes and the like are assembled to the capacitor element, thereby producing the capacitor 68a.

The semiconductor module 66 includes a semiconductor switching element such as a MOSFET or IGBT, and is formed in a substantial plate shape. According to the present embodiment, the rotary electric machine is provided with 2 pairs of three-phase windings, and an inverter circuit is provided corresponding to each three-phase winding. Hence, total 12 semiconductor modules 66 are provided in the electrical component 62.

The semiconductor module 66 is disposed between the cylindrical portion 71 of the casing portion 64 and the capacitor module 68. The outer peripheral surface of the semiconductor module 66 comes into contact with the inner peripheral surface of the cylindrical portion 71 and the inner peripheral surface of the semiconductor module 66 comes into contact with the outer peripheral surface of the capacitor module 68. In this case, heat produced in the semiconductor module 66 is propagated to the end plate portion 63 and radiated from the end plate portion 63.

The semiconductor module 66 may include a spacer 69 on an outer peripheral surface side, that is, between the semiconductor module 66 and the cylindrical portion 71 in the radial direction. In this case, in the capacitor module 68, since a cross-sectional shape of the transverse cross section orthogonal to the axial direction is a dodecagon, and a cross-sectional shape of the transverse cross section of the inner peripheral surface of the cylindrical portion 71 is a circle, the inner peripheral surface is a flat surface and the outer peripheral surface is a curved surface in the spacer 69. The spacer 69 may be formed integrating with the respective semiconductor modules 66 in an annular shape in the radially outside portion of the semiconductor modules 66. Note that the transverse cross-sectional shape of the inner peripheral surface of the cylindrical portion 71 may be the same dodecagon as that of the capacitor module 68. In this case, both of the inner peripheral surface and the outer peripheral surface of the spacer 69 may be configured as a flat shape.

According to the present embodiment, a cooling water passage 74 is formed in the cylindrical portion 71 of the casing portion 64 to allow the cooling water to flow therethrough. The heat produced in the semiconductor module 66 is also transmitted to the cooling water flowing through the cooling water passage 74. In other words, the casing portion 64 has a water-cooled mechanism. As shown in FIGS. 3 and 4, the cooling water passage 74 is formed in an annular shape to surround the electrical component 62 (semiconductor module 66 and capacitor module 68). The semiconductor module 66 is arranged along the inner peripheral surface of the cylindrical portion 71, and the cooling water passage 74 is provided at a position overlapping with the semiconductor module 66 inward/outward the radial direction.

The stator 50 is disposed outside the cylindrical portion 71 and the electrical component 62 is disposed inside the cylindrical portion 71. Hence, heat from the stator 50 is propagated to the cylindrical portion from outside the cylindrical portion 71. In this case, the stator 50 and the semiconductor module 66 is simultaneously cooled such that heat produced by heat generating members of the rotary electric machine 10 can be effectively radiated.

Further, the electrical component 62 is provided with an insulation sheet 75 disposed on one end face of the capacitor module and a wiring module 76 disposed on the other end face in the axial direction. In this case, one end face (end face on the bearing part 20 side) of the capacitor module 68 in the axial direction faces the end face portion 72 and overlaps with the end face portion 72 via the insulation sheet 75. The wiring module 76 is attached to the other end face (end face in the opening 65 side).

The wiring module 76 includes a body 76a made of synthetic resin and formed in a circular plate shape and a plurality of bus bars 76b and 76c embedded therein. The wiring module 76 is electrically connected to the semiconductor module 66 and the capacitor module 68 by the bus bars 76b and 76c. Specifically, the semiconductor module 66 has a connection pin 66a extending from the axial end surface. The connection pin 66a is connected to the bus bar 76b in a radially outside portion of the body 76a. The bus bar 76c extends towards an opposite side of the capacitor module 68 and is connected to the wiring member 79 at the tip end portion of the bus bar 76c.

As described above, according to the configuration in which the insulation sheet 75 and the wiring module 76 are respectively disposed at both sides of the capacitor module 68 in the axial direction, as a heat radiation path of the capacitor module 68, a path from both axial ends of the capacitor module 68 to the end face portion 72 and the cylindrical portion 71 is formed. Thus, heat radiation can be accomplished in the capacitor module 68 from the end face other than the outer peripheral surface where the semiconductor module is provided. In other words, heat can be radiated in not only the radial direction but also the axial direction.

Further, the capacitor module 68 has a hollow cylindrical shape in which the rotary shaft 11 is disposed in the inner peripheral portion thereof. Hence, heat produced by the capacitor module 68 can be radiated from the hollow cylindrical portion. In this case, air flow is produced with rotation of the rotary shaft 11, whereby the cooling effect can be enhanced.

In the wiring module 76, the control board 67 having a circular plate shape is attached. The control board 67 includes a printed circuit board (PCB) in which a predetermined wiring pattern is formed, and a control unit 77 provided with various ICs and microprocessors and the like is mounted thereon. The control board 67 is fixed to the wiring module 76 by a fixture such as screw. The control board 67 has an insertion hole 67a allowing the rotary shaft 11 to pass through at the center portion thereof.

The control board 67 is disposed in a portion opposite to the capacitor module 68 in both axial end portions of the wiring module 76, and the bus bar 76c of the wiring module 76 extends to the other side from one side of both side surfaces. According to this configuration, a notch portion may be provided on the control board 67 to avoid interference with the bus bar 76c. For example, a notch portion may be provided at a part of an outer edge portion of the control board 67 having a circular shape.

As described above, according to a configuration in which the electrical component 62 is accommodated in a space surrounded by the casing 64, and the housing 30, the rotor 40 and the stator 50 are provided as a layered structure outside the electrical component 62, electromagnetic noise produced in the inverter circuit can be appropriately shielded. Specifically, in the inverter circuit, switching control is performed in the respective semiconductor modules 66 by using PWM control with a predetermined carrier frequency, and electromagnetic noise may be produced by the switching operation. However, the electromagnetic noise can be appropriately shielded by the housing 30, the rotor 40, the stator 50 and the like which are present in radially outside portion of the electrical component 62.

In the vicinity of the end plate portion 63 in the cylindrical portion 71, an insertion hole 78 is formed, which allows the wiring member 79 (see FIG. 2) electrically connecting the stator 50 outside the end plate portion 63 and the electrical component 62 to pass therethrough. As shown in FIG. 2, the wiring member 79 is connected to the end portion of the stator winding 51 and the bus bar 76c of the wiring module 76 by pressure bonding or welding. The wiring member 79 is, for example, a bus bar. In the bus bar, the insertion hole 78 of which the bonding surface is preferably crushed flat may be provided at one portion or a plurality of portions. According to the present embodiment, insertion holes 78 are provided at 2 portions. According to the configuration in which 2 insertion holes are provided, the wiring terminals extended from 2 pairs of three-phase windings can readily be connected by the wiring member 79. Hence, it is preferable for connecting the multiphase windings.

As described, in the housing 30, as shown in FIG. 4, the rotor 40 and the stator 50 are provided in the order from the radially outside portion, and an inverter unit 60 is provided at a portion radially inside the stator 50. In the case where the radius of the inner peripheral surface of the housing is defined as d, the rotor 40 and the stator 50 are disposed radially outside a portion having a distance d×0.705 away from the center of rotation. In this case, when a first region X1 is defined as a radially inside region from an inner peripheral surface of the stator 50 (i.e. inner peripheral surface of the stator core 52) positioned radially inside the rotor 40, and a second region X2 is defined as a radially outside portion from an inner peripheral surface of the stator 50 to the housing 30, an area of the transverse cross section of the first region X1 is larger than the transverse cross section of the second region X2. Also, the volume of the first region X1 is larger than the volume of the second region X2, in a region where the magnet portion 42 of the rotor 40 and the stator winding 51 are overlapped.

When the rotor 40 and the stator 50 are defined as a magnetic circuit component, the first region X1 positioned radially inside with respect to the inner peripheral surface of the magnetic circuit component is larger than the second region X2 positioned between the inner peripheral surface of the magnetic circuit component to the housing 30.

Next, the configuration of the rotor 40 and the stator 50 will be described in more detail. Generally, a configuration of the stator in the rotary electric machine is known in which a plurality of slots are arranged in a circumferential direction on a stator core having a circular shape composed of laminated steel plates, and a stator winding is wound around the slots. Specifically, the stator core has a plurality of teeth arranged having predetermined intervals and extending in the radial direction from the yoke portion, and the slots are formed between adjacent teeth in the circumferential direction. In the slots, lead wires are accommodated in the radial direction in a plurality of layers and the lead wires constitute the stator winding.

However, according to the above-described stator structure, magnetic saturation occurs at tooth portions of the stator core accompanying with an increase in the magnetomotive force of the stator winding. This may limit the torque density of the rotary electric machine. In other words, in the stator core, rotating magnetic flux produced by energization of the stator winding is concentrated on the teeth, thereby producing magnetic saturation.

Generally, a configuration of an IPM rotor in a rotary electric machine is known in which a rotor core is disposed at the q axis. In such a case, a stator winding close to a d axis is excited, whereby excitation magnetic flux enters into the q axis from the stator in accordance with Fleming's law. Thus, a wide range of magnetic saturation may be produced at a q axis portion of the rotor.

Figure 7:
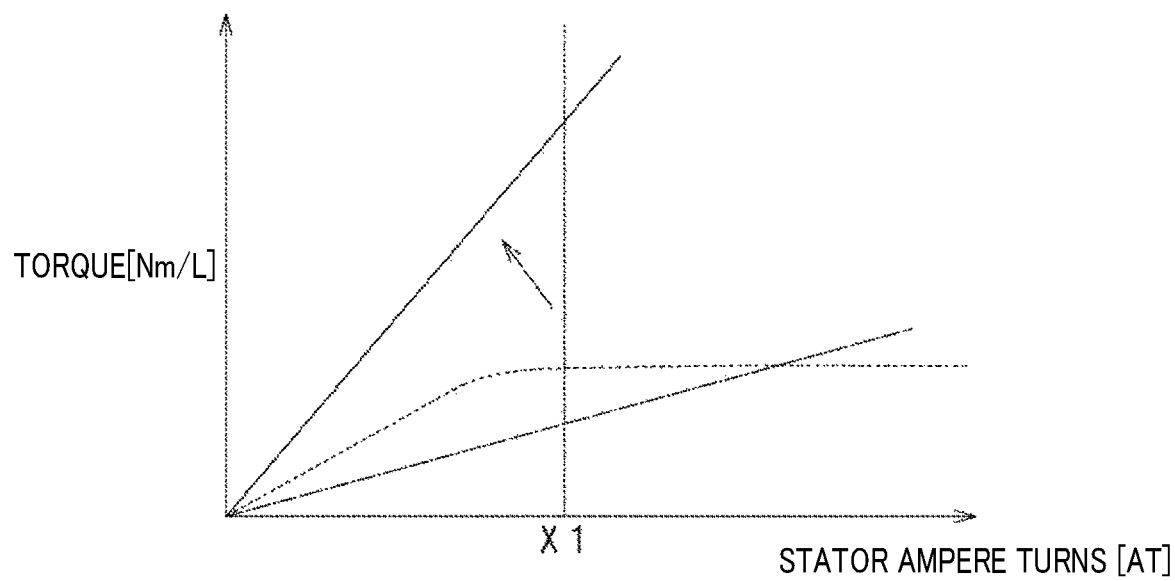
FIG. 7 is a torque chart showing a relationship between ampere turns of a stator winding and a torque density.

FIG. 7 is a torque chart showing a relationship between ampere turns [AT] indicating a magnetomotive force of the stator winding and a torque density. The dotted line shows characteristics of a general IPM rotor type rotary electric machine. As shown in FIG. 7, according to a general rotary electric machine, the magnetomotive force is increased at the stator and causes magnetic saturation at two portions of the teeth portions between slots and a q axis core portion. As a result, an increase in torque is restricted. Thus, in a general rotary electric machine, the designed ampere turn value is limited at a point X1.

In this respect, according to the present embodiment, in order to cancel the torque limitation due to magnetic saturation, the following configuration is adopted in the rotary electric machine 10. Specifically, as a first aspect, a slot-less structure is adopted in the stator 50 in order to avoid magnetic saturation produced in the tooth portion of the stator core of the stator, and a SPM motor is adopted in order to avoid the magnetic saturation produced in the q axis core portion of the IPM rotor. According to the first aspect, the above-described two portions where magnetic saturation is produced can be removed. However, torque in the low current region may be lowered (see one dot chain line in FIG. 7). In this respect, as a second aspect, a polar anisotropic structure is utilized where the magnetic path is extended in the magnet portion 42 of the rotor 40 to enhance the magnetic force, thereby recovering the lowered torque by the strengthened magnetic flux of the SPM rotor.

Also, as a third aspect, a flat conductor wire structure is adopted in which a thickness of the wire in the radial direction is made smaller in the coil side portion 53 of the stator winding 51, thereby recovering the lowered torque. Here, it is considered that a polar anisotropic structure where the magnetic forced is enhanced may produce a larger amount of eddy current in the opposite stator winding 51. However, according to the third means, due to the flat conductor wire structure having a smaller thickness in the radial direction, occurrence of eddy current in the radial direction in the stator winding 51 can be suppressed. Thus, according to the respective first to third configurations, as shown with the solid line in FIG. 7, occurrence of large amounts of eddy current due to a magnet having high magnetic force is suppressed while significantly improving the torque characteristics by using the magnet having high magnetic force.

Further, a fourth aspect adopts a magnet portion having a magnetic flux density distribution close to a sinewave by utilizing the polar anisotropic structure. According to this configuration, pulse control which will be described later is utilized to enhance the sinewave consistency so as to enhance the torque, while further suppressing the eddy current loss because of gradual change in the magnetic flux compared to the radial magnet.

As a fifth means, the stator winding 51 is configured as a strand conductor structure (strand assembly) in which a plurality of strands are collected and twisted. Thus, the fundamental wave component is collected allowing a large amount of current to flow. Further, since the cross-sectional area of each strand is made smaller, the eddy current occurring on the wire extended in the circumferential direction with the flat conductor wire structure can be effectively suppressed more than in the third aspect in which the thickness is made smaller in the radial direction. Then, since a plurality of strands are twisted, for the magneto motive force of the conductor, the eddy current produced relative to the magnetic flux produced in accordance with the right-handed screw law of current conduction direction can be cancelled.

Thus, with the fourth aspect and the fifth aspect, in addition to the second aspect where the magnet having high magnet force is adopted, the eddy current loss caused by the high magnet force is suppressed and the torque can be enhanced.

Figure 8:
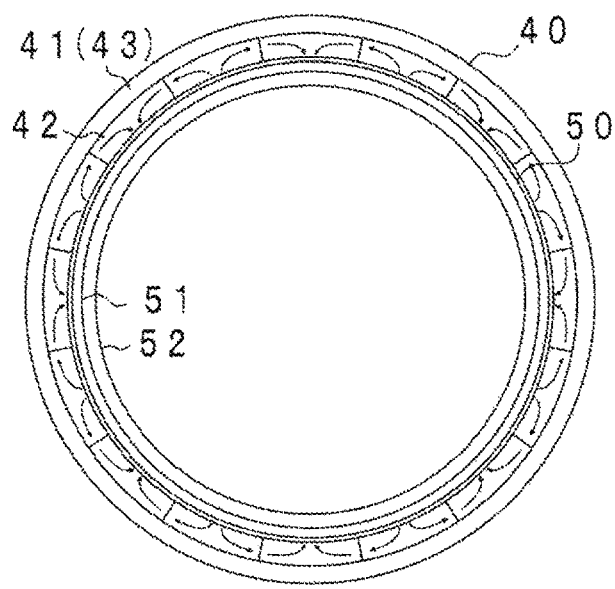
FIG. 8 is diagram showing a transverse cross-sectional view of a rotor and a stator.
Figure 9:
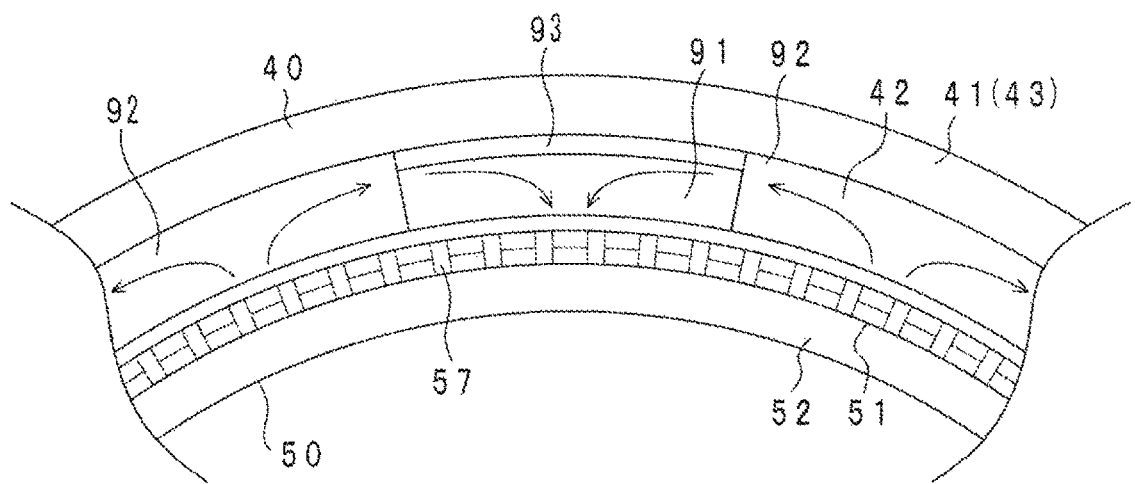
FIG. 9 is a diagram in which a part of FIG. 8 is enlarged.
Figure 10:
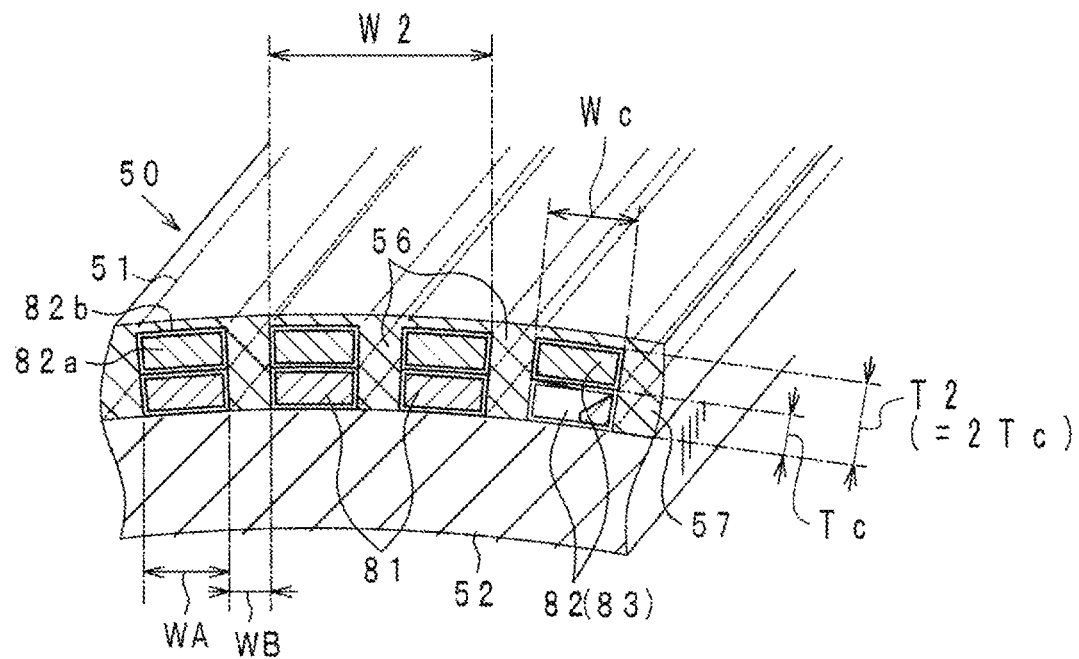
FIG. 10 is a diagram showing a cross-sectional view of a transverse cross-section of the stator.
Figure 11:
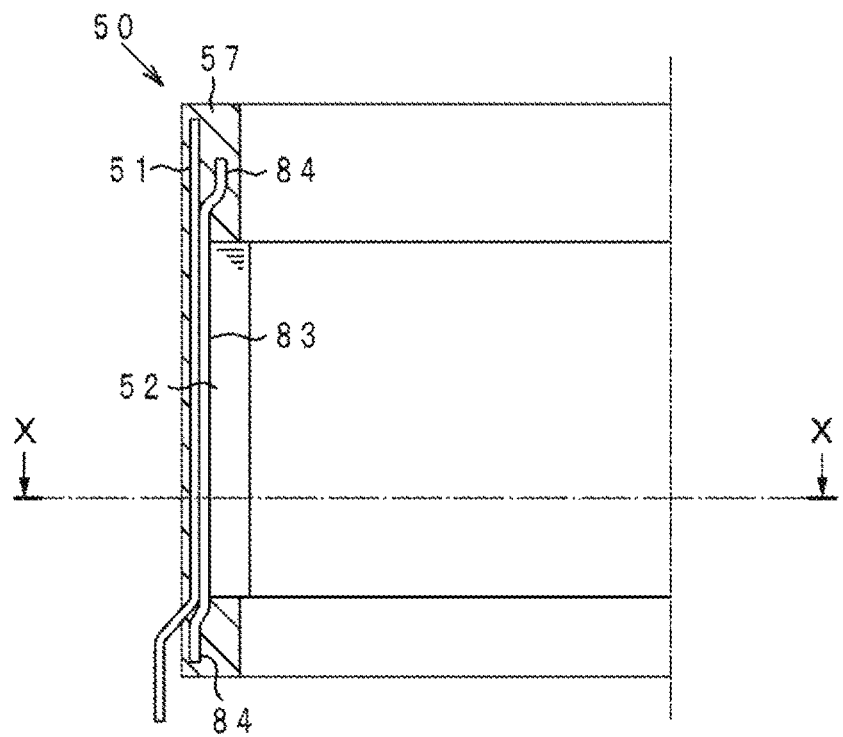
FIG. 11 is a diagram showing a cross-sectional view of a vertical cross-section of the stator.
Figure 12:
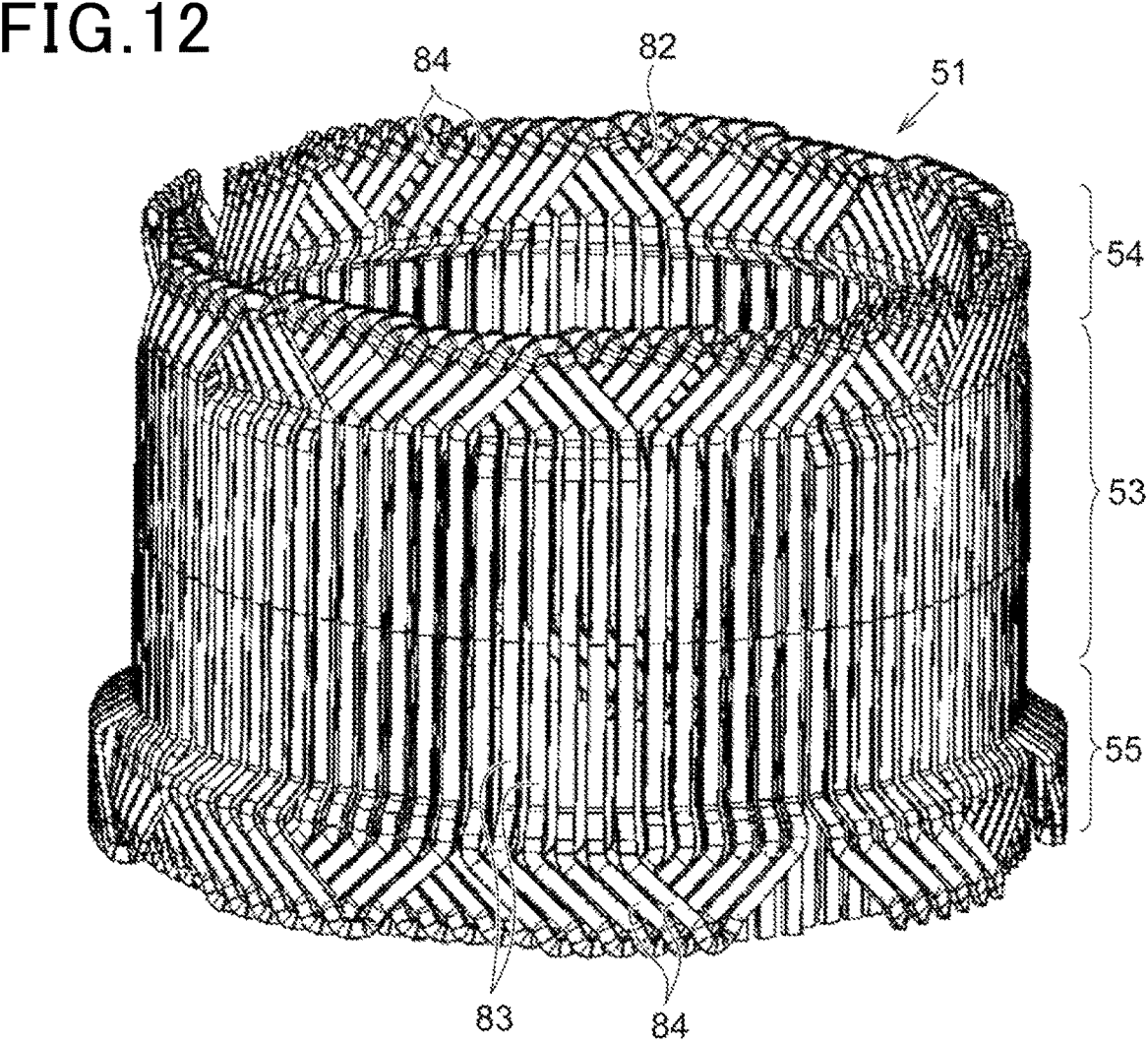
FIG. 12 is a diagram showing a perspective view of stator windings.

Hereinafter, the above-described slot-less structure of the stator 50, the flat conductor wire structure of the stator winding 51 and the polar anisotropic structure of the magnet portion 42 will be separately described. Firstly, the slot-less structure of the stator 50 and the flat conductor wire structure of the stator winding 51 will be described. FIG. 8 is a transverse cross-sectional view of the rotor 40 and the stator 50, FIG. 9 is a diagram in which a part of the rotor 49 and the stator 50 shown in FIG. 8 is enlarged. FIG. 10 is a cross-sectional view showing a transverse cross-section of the stator 50 sectioned along the line X-X of FIG. 11, FIG. 11 is a cross-sectional view showing a vertical cross-section of the stator 50. FIG. 12 is a perspective view of the stator winding 51. In FIGS. 8 and 9, a magnetizing direction of the magnet in the magnet portion 42 is shown with an arrow.

As shown in FIGS. 8 to 11, the stator core 52 is configured in which a plurality of electrical steel plates are laminated in the axial direction and has a cylindrical shape having a predetermined thickness in the radial direction. The stator core 52 has the stator winding 51 attached to a portion radially outside which is a rotor 40 side. In the stator core 52, the outer peripheral surface in the rotor 40 side is a conductor wire installation portion (conductor area). The outer peripheral surface of the stator core 52 is formed to have a curved surface without a convex-concave shape, and a plurality of conductor groups 81 are arranged in the circumferential direction on the outer peripheral surface at predetermined intervals. The stator core 52 serves as a back yoke constituting a part of the magnetic circuit which causes the rotor 40 to rotate. In this case, teeth (iron core) made of soft magnetic material are not provided between adjacent conductor groups 81 in the circumferential direction (i.e. a slot-less configuration). In the present embodiment, a resin material of the sealing member 57 is disposed in the gap 56 of respective conductor groups 81. In other words, a conductor-to-conductor member (hereinafter also referred to as inter-conductor member) provided between respective conductor groups 81 in the circumferential direction 81 is constituted by the sealing member 57. According to a state where the sealing member 57 is not yet sealed, in a portion radially outside the stator core 52, the conductor groups 81 are arranged in the circumferential direction at predetermined intervals via gaps 56 serving as inter-conductor regions, thereby constituting the stator 50 having the slotless structure. In other words, the respective conductor groups 81 are composed of two conductors 82 which will be described later, and non-magnetic material occupies portions between respective two conductor groups 81 which are adjacently positioned in the circumferential direction. The non-magnetic material includes, other than the sealing member 57, a non-magnetic gas such as air or non-magnetic liquid. Hereinafter, the sealing member 57 is also referred to as an inter-conductor member.

The configuration in which teeth are provided between respective conductor groups 81 arranged in the circumferential direction refers to a configuration in which the teeth have a predetermined thickness in the radial direction and have a predetermined width in the circumferential direction to constitute a part of the magnetic circuit between respective conductor groups 81, that is, a magnetic path of the magnet. In this respect, a configuration in which teeth are not provided between the respective conductor groups refers to a configuration in which the above-described magnetic circuit is not formed.

As shown in FIG. 10, the stator winding (i.e. armature winding) 51 is formed to have a predetermined thickness T2 (hereinafter referred to as a first dimension) and a width W2 (hereinafter referred to as a second dimension). The thickness T2 refers to the shortest distance between the outer surface and the inner surface which mutually face in the radial direction of the stator winding 51. The width W2 refers to a length in the circumferential direction of a part of the stator winding 51 serving as one of multiphase windings (three phases according to the embodiment: three phases U, V, W or three phases X, Y, Z) of the stator winding 51. Specifically, as shown in FIG. 10, when two adjacent conductor groups 81 in the circumferential direction serve as one of the three-phases windings, for example, the U phase, an end to end length of the two conductor groups 81 in the circumferential direction is defined as W2. The thickness T2 is smaller than the width W2.

Note that the thickness T2 may preferably be smaller than the total width dimension of the two conductor groups 81 existing in the width W2. In the case where the cross-sectional shape of the stator winding 51 (more specifically conductor 82) is a true circular shape or an elliptic shape or a polygonal shape, in the cross-section of the conductor 82 sectioned along the stator 50, the maximum length of the stator 50 in the radial direction at the cross-section may be defined as W12, and the maximum length of the stator 50 in the circumferential direction at the cross section may be defined as W11.

As shown in FIGS. 10 and 11, the stator 51 is sealed by the sealing member 57 made of synthetic resin material as a sealing member (molding member). In other words, the stator winding 51 is molded together with the stator core 52 by the molding member. Note that the resin may be regarded as a non-magnetic material or equivalent of a non magnetic material, that is, Bs=0 (i.e. magnetic flux is 0).

When viewing the transverse cross section shown in FIG. 10, the synthetic resin is filled between the respective conductor groups 81, that is, in each gap 56. In other words, an insulation member is interposed between respective conductor groups 81 by the sealing member 57. Specifically, the sealing member 57 serves as the insulation member in the gap 56. The sealing member 57 is provided in a region radially outside the stator core 52 including the respective conductor groups 81, that is a region where the thickness in the radial direction is larger than the thickness in the radial direction of the respective conductor groups 81.

Also, when viewing the vertical cross section shown in FIG. 11, the sealing member 57 is provided in a region including a turn portion 84 of the stator winding 51. In a portion radially inside the stator winding 51, the sealing member 57 is provided in a region including at least a part of an end face of the stator core 52 facing a portion in the axial direction. In this case, almost the entire stator winding 51 is sealed by the resin excluding the end portions of the respective phase windings, that is, connection terminals for the inverter circuit.

According to a configuration in which the sealing member 57 is provided in a region including the end face of the stator core 52, the sealing member 57 is able to press the laminated steel plate of the stator core 52 inward in the axial direction. Thus, the laminated state of the respective steel plates can be held by using the sealing member 57. According to the present embodiment, the inner peripheral surface of the stator core 52 is not resin-sealed. Alternatively, a configuration of entirely sealing the stator core 52 including the inner peripheral surface of the stator core 52 may be employed.

In the case where the rotary electric machine 10 is used as a vehicle power source, the sealing member 57 may preferably be made of a fluororesin having high heat resistance, an epoxy resin, a PPS resin, PEEK resin, LCP resin, a silicone resin, a PAI resin, a PI resin or the like. When considering a linear expansion coefficient for reducing cracks due to expansion difference, the same material as an outer film of the conductor in the stator winding 51 may preferably be used. In other words, silicone resin having a double or more linear expansion coefficient compared to other resin materials may preferably be excluded. In an electrical product having no combustion machine, such as an electric vehicle, PPO resin and phenol resin having a heat resistance value of 180 degrees C., or FRP resin, may be utilized. This is not applied to a field in which an ambient temperature of the rotary electric machine is less than 100 degrees C.

The torque of the rotary electric machine 10 is proportional to the magnetic flux. Here, in the case where the stator core has teeth, the maximum amount of flux of the stator is restricted depending on the saturation magnetic flux density. In the case where the stator core does not have teeth, the maximum amount of flux of the stator is not restricted. Therefore, the configuration has an advantage when increasing the torque of the rotary electric machine by increasing the energization current to the stator winding 51

According to the present embodiment, a structure in which no teeth are provided in the stator 50 (slot-less structure) is employed. Hence, the inductance of the stator 50 is lowered. Specifically, in the stator of a typical rotary electric machine where conductors are accommodated in respective slots divided by a plurality of teeth, the inductance is, for example, around 1 mH. In contrast, in the stator 50 according to the present embodiment, the inductance is reduced to be 5 to 60 µH. According to the present embodiment, even if the rotary electric machine 10 is configured as an outer rotor structure, the mechanical time constant Tm can be lowered by a reduction of the inductance of the stator 50. In other words, the mechanical time constant Tm can be reduced while achieving a high torque configuration. The mechanical time constant Tm is calculated by the following equation, where J is inertia, L is inductance, Kt is torque constant, and Ke is the counter electromotive force constant. With the following equation, it is realized that the mechanical time constant Tm is reduced by the reduction of the inductance.

$$Tm=(J\times L)/(Kt\times Ke)$$

The respective conductor groups 81 positioned radially outside the stator 52 are configured such that a plurality of conductors 82 having a flat rectangular shape of the cross section are arranged in the radial direction of the stator core 52. The respective conductors 82 are arranged in a direction where the transverse cross section satisfies radial direction dimension<circumferential direction dimension. Thus, the respective conductor groups 81 are reduced in thickness in the radial direction. Further, in addition to reduction of the thickness in the radial direction, the conductor region extends flat towards a region where the teeth were present as a conventional configuration, so as to produce the flat conductor wire structure. Thus, an increase in the heat quantity of the conductor caused by the smaller cross-sectional area due to the reduced thickness is suppressed by increasing the cross-sectional area of the conductor flattened in the circumferential direction. According to a configuration in which a plurality of conductors are arranged in the circumferential direction and these conductors are connected in parallel, even if the cross-sectional area of the conductor becomes smaller by the conductor coating, effects and advantages can be obtained under the same theory. Note that each of the conductor groups 81 and each of the conductors 82 are also referred to as a conductive member.

Since slots are not provided, in the stator winding 51 according to the present embodiment, a conductor region where the stator winding 51 occupies the entire periphery in the circumferential direction can be designed to be larger than a non-conductor occupied region where the stator winding 51 is not provided. According to a conventional vehicle rotary electric machine, the ratio between the conductor region and the non-conductor occupied region of the stator winding in the entire periphery in the circumferential direction is usually smaller than or equal to 1. On the other hand, according to the present embodiment, the respective conductor groups 81 are provided such that the conductor region is similar to the non-conductor occupied region or the conductor region is larger than the non-conductor occupied region. Here, as shown in FIG. 10, when a conductor region where the conductors 82 (i.e. linear portion 83 which will be described later) are arranged in the circumferential direction is defined as WA, and an inter-conductor region which is a region between adjacent conductors 82 is defined as WB, the conductor region WA is larger than the inter-conductor region WB in the circumferential direction.

As the configuration of the conductor groups 81 in the stator winding 51, the thickness dimension in the radial direction of the conductor group 81 is smaller than the width dimension corresponding to one phase in the circumferential direction within one magnetic pole. In other words, according to a configuration in which the conductor groups 81 are each configured of two layered conductors 82 in the radial direction and two conductor groups 81 are provided corresponding to one phase in the circumferential direction within one magnetic pole, in the case where the thickness dimension of the respective conductor groups 82 in the radial direction is defined as Tc, and the width dimension of the respective conductors 82 in the circumferential direction is defined as Wc, a condition Tc×2<Wc<2 is satisfied. As other configuration, according to a configuration in which the conductor groups 81 are each configured of two layered conductors 82 and one conductor group 81 is provided corresponding to one phase in the circumferential direction within one magnetic pole, a condition Tc×2<Wc may be satisfied. Specifically, for a conductor portion (conductor group 81) arranged in the stator winding 51 at predetermined intervals in the circumferential direction, the thickness dimension Tc in the radial direction is smaller than the width dimension corresponding to one phase in the circumferential direction within one magnetic pole.

For each of the respective conductors 82, the thickness dimension Tc in the radial direction may be smaller than the width dimension Wc in the circumferential direction. Further, the thickness dimension (2Tc) in the radial direction of the conductor groups 81 composed of two layered conductors 82 in the radial direction, that is, the thickness dimension (2Tc) in the radial direction of the conductor groups 81 may be smaller than the width dimension We in the circumferential direction.

The torque of the rotary electric machine 10 is in approximately inverse-proportion to the thickness dimension in the radial direction of the stator core 52 in the conductor groups 81. In this respect, the configuration has advantages in order to increase the torque of the rotary electric machine since the thickness of the conductor groups 81 is reduced in a portion radially outside the start core 52. This is because the magnetic resistance can be lowered by shortening the distance between the magnet portion 42 of the rotor 40 and the stator core 52 (i.e. length of a portion having no iron). According to this configuration, the interlinkage flux of permanent magnet in the stator core 52 can be larger, thereby increasing the torque.

Further, the thickness of the conductor groups 81 is reduced, whereby the stator core 52 is likely to absorb leakage of magnetic flux from the conductor groups 81. Hence, the magnetic flux can be prevented from not being effectively used to enhance the torque and from leaking externally. In other words, the magnetic force can be prevented from being powered by magnetic flux leakage, and the interlinkage flux of the permanent magnet in the stator core 52 can be increased to enhance the torque.

For the conductor 82, the surface of the conductor body 82a is composed of a coated conductor coated by the insulation coating 82b, where a portion between conductors 82 which are mutually overlapped in the radial direction and a portion between the conductor 82 and the stator core 52 are each insulated. This insulation coating 82b is constituted by a coating in the case where the strand 86 (described later) is a self-welding coating, or an overlapped insulation member other than the coating of the strand 86. Each phase winding constituted by the conductor 82 has an insulation property maintained by the insulation coating 82b excluding a portion exposed for the connection. The exposed portion is, for example, an input-output terminal portion, or a neutral point for the star connection. In the conductor groups 81, a resin curing or a self-welding coating is used to mutually fixing the adjacent conductors 82 in the radial direction. Thus, insulation breakdown, vibration and sound caused by rubbing between conductors 82 can be suppressed.

Figure 13:
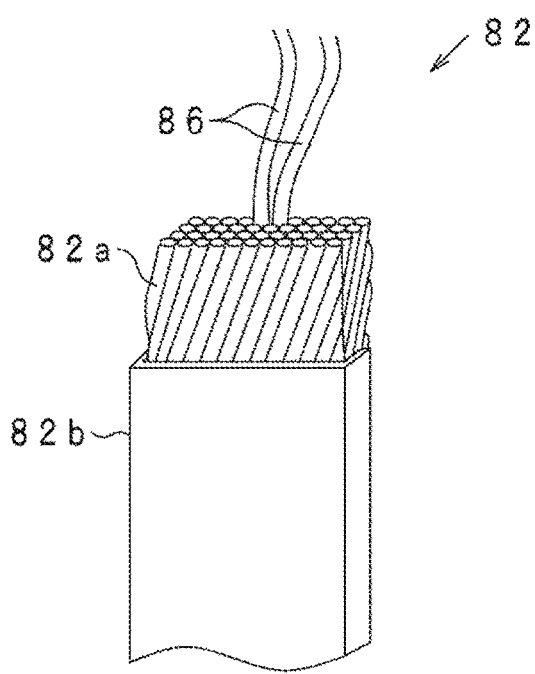
FIG. 13 is a diagram showing an example of an overall structure of a conductor constituting the stator winding.
Figure 14:
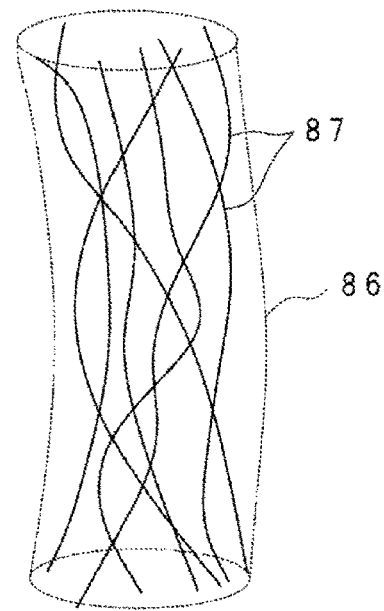
FIG. 14 is an overall diagram showing an example of a strand wire constituting the conductor.

According to the present embodiment, the conductor 82a is constituted by assembly of a plurality of wires. Specifically, as shown FIG. 13, the conductor 82a is formed to be like a fabric by twisting the plurality of strands 86. As shown in FIG. 14, the strand 86 is constituted by a composite in which a conductor material 87 having a fine fiber shape is bundled. For example, the strand 86 is a composite of CNT (carbon nano tube) fiber. As the CNT fiber, a fiber containing fine boron fiber, where at least a part of carbon is substituted by boron, is used. As carbon-based fine fiber, a vapor phase growth carbon fiber can be used instead of CNT fiber. Preferably, CNT fiber may be used. Also, the surface of the strands 86 may preferably be covered by a so-called enamel coating which is a polymer insulation layer composed of a polyimide coating or an amide-imide coating.

The conductor 82 constitutes an n-phase winding in the stator winding 51. The respective strands 86 of the conductor 82 (i.e. conductor 82a) are adjacently positioned in contact with each other. For the conductor 82, the winding conductor includes a portion formed by twisting a plurality of strands 86 at one or more portions in the phase and is configured as a strand assembly in which resistance between twisted strands 86 is larger than the resistance of each strand 86. In other words, each adjacent two strands 86 have a first electrical resistivity in the adjacent direction, and when each strand 86 has a second electrical resistivity in the longitudinal direction, the first electrical resistivity is larger than the second resistivity. Note that the conductor 82 may be formed by a plurality of strands 86 and may be configured as a strand assembly covering the plurality of strands 86 by an insulation member having extremely high first electrical resistivity. Further, the conductor 82a of the conductor 82 is constituted by a plurality of twisted strands 86.

Since the above-described conductor 82a is configured by twisting the plurality of strands 86, eddy current can be prevented from occurring at the respective strands 86, and the eddy current can be reduced at the conductor 82a. Moreover, the respective strands 86 are twisted. Hence, in a single strand 86, portions where directions of applied magnetic field become mutually opposite are generated, thereby cancelling a counter electromotive voltage. As a result, also the eddy current can be reduced. In particular, the strand 86 is constituted by the conductor material 87 having a fiber shape, whereby thinning of the conductor can be accomplished and the number of twists can be significantly increased. As a result, the eddy current can be appropriately reduced.

Note that an insulation method between strands 86 is not limited to the above-described polymer insulation film, but a method in which a contact resistance is used to limit the current flowing between the twisted strands 86 may be employed. Specifically, as long as a relationship where the resistance between the twisted strands 86 is larger than the resistance of each strand 86 itself is satisfied, with a voltage difference caused by difference between resistances, the above-described effects and advantages can be obtained. For example, a manufacturing facility for generating the strand 86 and a manufacturing facility for producing the stator 50 (armature) of the rotary electric machine 10 may be utilized as independent facilities, then the strand 86 may be oxidized because of a transportation time and a work interval, to increase the contact resistance.

As described, the conductor 82 has a cross-section having a flat rectangular shape and is arranged by disposing a plurality of conductors 82 in the radial direction. For example, a plurality of strands 86, which are coated by a self-welding coating including a welded layer and an insulation layer, are assembled in a state of being twisted, and their welded layers are welded so as to keep their shape. The conductor 86 may be fixed with a synthetic resin or the like to form a desired shape in a state where strands having no welded layer and no self-welding coating are twisted. In the case where the thickness of the insulation coating of the conductor 82 is set to be, for example, 80 μm to 100 μm, which is thicker than the coating thickness (5 μm to 40 μm) of a general conductor, the conductor 82 and the stator core 52 can be insulated even without interposing an insulating paper therebetween.

The insulation coating 82b may preferably be constituted to have a higher insulation property than the insulation layer of the strand 86 to insulate between phases. For example, when the thickness of the polymer insulation later of the strand 86 is set to be, for example, approximately 5 μm, an appropriate insulation between phases may preferably be performed by setting the thickness of the insulation coating 82b of the conductor 82 to be 80 μm to 100 μm.

Moreover, the conductor 82 may be bundled without twisting a plurality of strands 86. In other words, the conductor 82 may be constituted such that a plurality of strands 86 are twisted in the entire longitudinal length thereof, or may be constituted such that a plurality of strands 86 are twisted in a part of longitudinal length thereof, or may be constituted such that a plurality of strands 86 are bundled together without being twisted anywhere in the entire longitudinal length. In summary, the respective conductors 82 which constitute the conductor portion are configured as a strand assembly in which the resistance between bundled strands is larger than the resistance of each strand 86.

Each conductor 82 is formed being folded such that conductors 82 are arranged with a predetermined arrangement pattern in the circumferential direction of the stator winding 51. Thus, phase windings corresponding to respective phases as the stator winding 51 are formed. As shown in FIG. 12, in the stator winding 51, the linear portion 83 extending in the axial direction in each conductor 82 forms the coil side portion 53, and the turn portion 84 protruding towards both outer sides from the coil side portion 53 forms a coil end 54, 55. Each conductor 82 has the linear portion 83 and the turn portion 84 which are alternately positioned to constitute a continuous conductor having a wave-wound shape. The linear portion 83 is disposed at a position facing the magnet portion 42 in the radial direction. The linear portions 83 in the same phase arranged at a predetermined interval in a portion radially outside the magnet portion 42 are mutually connected by the turn portion 84. Note that the linear portion 83 corresponds to magnet facing portion.

According to the present embodiment, the stator winding 51 is formed by winding in an annular shape with a distributed winding. In this case, in the coil side portion 53, the linear portions 83 are arranged in a circumferential direction at an interval corresponding to one pole pair of the magnet portion 42, and in the coil end 54 and 55, respective linear portions 83 in each phase are mutually connected by the turn portion 84 formed in a substantial V-shape. In the respective linear portions 83 paired with one corresponding pole pair, current directions are mutually opposite. Also, a combination of a pair of linear portions 83 connected by the turn portion 84 is different between one coil end 54 and the other coil end 55, and the connection at the coil ends 54 and 55 are repeated in the circumferential direction, thereby forming the stator winding 51 in a substantially cylindrical shape.

More specifically, the stator winding 51 constitutes a winding in each phase using two pairs of conductors 82, in which one three-phase winding (U phase, V phase, W phase) and the other three-phase winding (X phase, Y phase, Z phase) in the stator winding 51 are provided in two layers of radially inner and outer portions. In this case, 2×S×m=2Sm conductors 82 are formed for one pole pair, where the number of phases of the stator winding 51 is S (6 according to embodiments) and the number of conductors 82 is m. According to the present embodiment, since the number of phases S is 6, m is 4, and the rotary electric machine has 8 pair of poles (16 poles), 6×4×8=192 conductors 82 are arranged in the circumferential direction of the stator core 52.

The stator winding 51 shown in FIG. 12 is configured such that the linear portions 83 are arranged in the coil side portion 53, to be overlapped in two adjacent layers in the radial direction and the turn portions 84 extend, in the coil ends 54 and 55, from respective linear portions 83 overlapping in the radial direction, towards mutually opposite circumferential directions. In other words, according to the conductors 82 adjacently positioned in the radial direction, orientations of the turn portions 84 are mutually opposite except at the end portion of the stator winding 51.

Figure 15A:
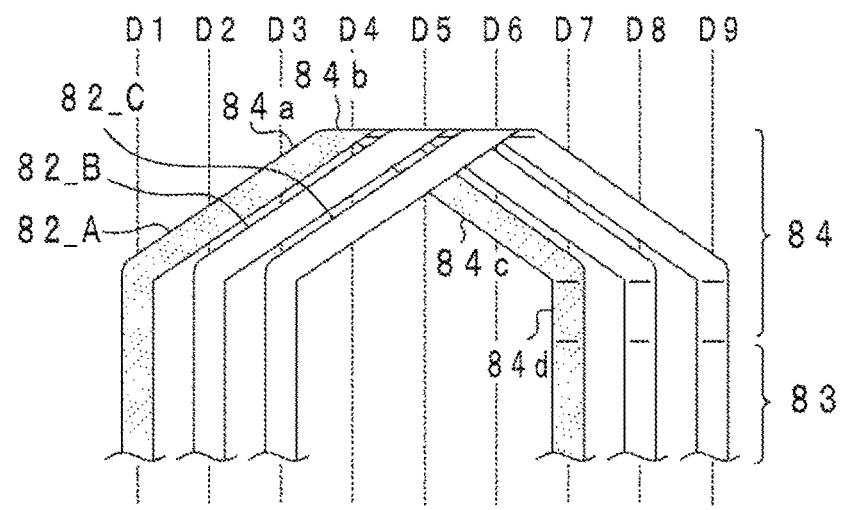
FIG. 15A is an overall diagram showing a configuration of each conductor in an nth layer in which a shape of the conductor is shown when viewed from a side of the stator winding.
Figure 15B:
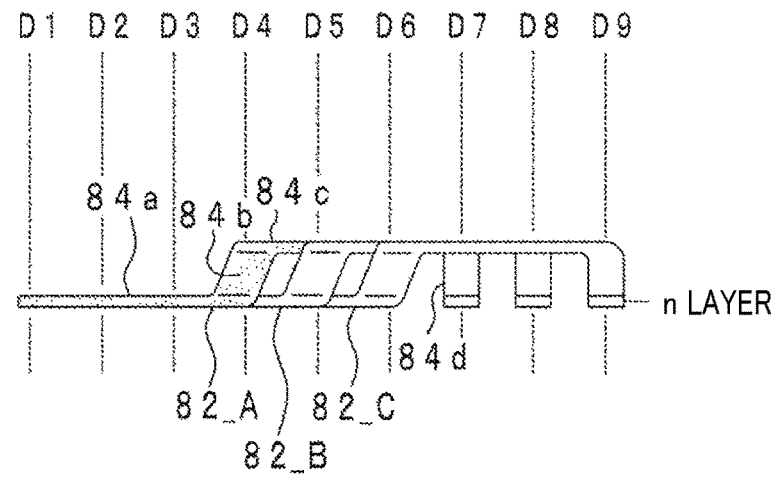
FIG. 15B is an overall diagram showing a configuration of each conductor in the nth layer in which a shape of the conductor is shown when viewed in an axial direction of the stator winding.

Here, a wound structure of the conductor 82 of the stator winding 51 will be described in detail. According to the present embodiment, a plurality of conductors 82 formed by wave winding are provided to be overlapped in a plurality of layers (e.g. two layers) adjacently positioned in the radial direction. FIGS. 15A and 15B show states of respective conductors 82 in an nth layer, in which FIG. 15A shows a shape of the conductor 82 when viewed from the lateral side of the stator winding 51, and FIG. 15B shows a shape of the conductor 82 when viewed from one axial end of the stator winding 51. In FIGS. 15A and 15B, positions at which the conductor groups are disposed are indicated as D1, D2, D3 and so on. Further, for convenience of explanation, only three conductors 82 are shown and each of the three conductors 82 is indicated by first conductor 82_A, 82_B, and 82_C.

In the respective conductors 82_A to 82_C, the linear portions 83 are all disposed at positions in the nth layer, that is, the same position in the radial direction, and the linear portions 83 positioned at 6 positions (3×m pairs) apart from each other in the circumferential direction are connected by the turn portions 64. Specifically, in the respective conductors 82_A to 82_C, both two ends of seven linear portions 83 adjacently arranged in the circumferential direction of the stator winding 51 are mutually connected by one turn portion 84 on the same circle of which the center is the axial center of the rotor 40. For example, in the first conductor 82_A, a pair of linear portions 83 are disposed at D1 and D7 and the pair of linear portions are connected by the turn portion 84 having an inverse-V shape. Other conductors 82_B, and 82_C are arranged such that the positions in the same nth layer are shifted one by one in the circumferential direction. In this case, since the respective conductors 82_A to 82_C are arranged in the same layer, the turn portions 84 may interfere with each other. In this respect, according to the present embodiment, a part of the turn portion 84 of the respective conductors 82_A to 82_C is offset in the radial direction to form an interference avoiding portion.

Specifically, the turn portion 84 of the respective conductors 82_A to 82_C includes an inclined portion 84a extending in the circumferential direction on the same circle (first circle), an apex portion 84b shifted from the inclined portion 84a towards a portion (upper side shown in FIG. 15B) radially inside the same circle to reach another circle (second circle), and a return portion 84d returning to the second circle from the inclined portion 84c extending in the circumferential direction on the second circle and the first circle. The apex portion 84b, the inclined portion 84b and the return portion 84d correspond to an interference avoiding portion. Note that the inclined portion 84c may be shifted towards radially outside the inclined portion 84a.

Specifically, the turn portion 84 of the respective conductors 82_A to 82_C includes one side inclined portion 84a and the other side inclined portion 84c on both sides across the apex portion 84b as a center position in the circumferential direction. The positions of the respective inclined portions 84a, 84c (positions in the front-back direction on the paper surface shown in FIG. 15A, and positions in the up-down direction shown in FIG. 15B) are mutually different. For example, the turn portion 84 of the first conductor 82_A extends in the circumferential direction with a starting position D1 in the nth layer, turns in the radial direction (e.g. radially inward) at the apex portion 84b which is a center position in the circumferential direction, turns again in the circumferential direction to extend again in the circumferential direction, and then turns in the radial direction (e.g. radially outward at the return portion 84d to reach the D7 position in the nth layer as an end position.

According to the above-described configuration, in the conductors 82_A to 82_C, each respective inclined portion 84a is arranged as the first conductor 82A→the second conductor 82_B→the third conductor 82_C in this order from top to bottom, the vertical positions of the respective conductors 82_A to 82_C are switched at the apex portion 84b, and the other respective inclined portions 84 are arranged as the third conductor 82_C→the second conductor 82_B→the first conductor 82_A in this order from up to down. Hence, the respective conductors 82_A to 82_C can be arranged in the circumferential direction without interfering with each other.

Here, in the configuration in which a plurality of conductors 82 are overlapped in the radial direction to constitute the conductor group 81, the turn portion 84 connected to the linear portion 83 in a portion radially inside among the respective linear portions 83 in the plurality of layers and the turn portion 84 connected to the linear portion 83 in a portion radially outside among the respective linear portions 83 in the plurality of layers, may be disposed apart from these linear portions 84 in the radial direction. Also, in the case where the plurality of conductors 82 in the plurality of layers are bent towards the same side in the radial direction, in the end portion of the turn portion 84, that is, in the vicinity of a boundary portion with the linear portion 83, an insulation property may preferably be prevented from being lost due to interference between conductors 82 in the adjacent layers.

Figure 16:
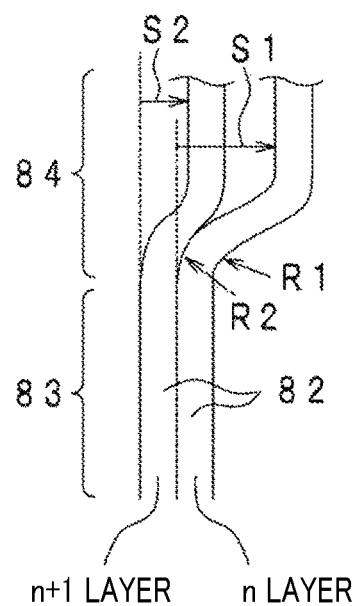
FIG. 16 is an overall diagram showing a configuration of a conductor in the nth layer and a conductor in the (n+1)th layer.

For example, at D7 to D9 shown in FIGS. 15A and 15B, respective conductors 82 overlapped in the radial direction are each bent towards the radial direction at the return portion 84d of the turn portion 84. In this case, as shown in FIG. 16, curvature radius of a bending part may be differentiated between the conductor 82 in the nth layer and the conductor 82 in the (n+1)th layer. Specifically, the curvature radius R1 of the conductor 82 in the radially inside portion (nth layer) is set to be smaller than the curvature radius R2 of the conductor 82 in the radially outside portion ((n+1)th layer).

Further, an amount of shift in the radial direction may be differentiated between the conductor 82 in the nth layer and the conductor 82 in the (n+1)th layer. Specifically, an amount of shift S1 of the conductor 82 in the radially inside portion (nth layer) is set to be larger than an amount of shift of the conductor 82 in the radially outside portion ((n+1)th layer).

According to the above-described configuration, even in a case where the respective conductors 82 overlapped in the radial direction are bent towards the same direction, mutual interference of the respective conductors 82 may preferably be avoided. Thus, better insulation properties are obtained.

Next, a polar anisotropy structure of the magnet portion 42 of the rotor 40 will be described. As shown in FIGS. 8 and 9, the magnet portion 42 has an annular shape and is provided inside the rotor body 41 (i.e. inner periphery side of magnet supporting portion 43). The magnet portion 42 is configured using a magnet arrangement referred to as a Halbach array. In other words, the magnet portion 42 includes a first magnet 91 in which the magnetizing direction (orientation of magnetic pole) is the radial direction, and a second magnet 92 in which the magnetizing direction (orientation of magnetic pole) is the circumferential direction. In the magnet portion 42, the first magnet 91 are arranged at predetermined intervals in the circumferential direction and the second magnet 92 are arranged at positions between first magnet adjacently positioned in the circumferential direction. The first magnets 91 and the second magnets 92 are permanent magnets made of rare earth magnets such as neodymium magnets.

The first magnets 91 are arranged to be apart from each other in the circumferential direction such that poles in a side opposite to the stator 50 (inner periphery side) alternately change N pole and S pole. Also, the second magnets 92 are arranged such that the orientation of the magnetic pole in the circumferential direction becomes alternately opposite at portions adjacent to the respective first magnets 91.

Moreover, a magnetic material 93 composed of, for example, electrical steel plates, a soft iron and a dust core are arranged in an outer peripheral side of the first magnet 91, that is, a magnet support portion 41 side of the rotor body 41. In this case, the length of the magnetic material 93 in the circumferential direction (especially, length in the circumferential direction of a side radially inside the rotor 40 of the magnetic material 93) is the same as the length in the circumferential direction of the first magnet 91 (especially, length in the circumferential direction of a side radially outside the rotor 40 of the first magnetic material 91). In a state where the first magnet 91 and the magnetic material 93 are integrated, the thickness in the radial direction of the integrated body is the same as the thickness in the radial direction of the second magnet 92. In other words, the thickness in the radial direction of the first magnet 91 is smaller than that of the second magnet 92 by the thickness in the radial direction of the magnetic material 93. The respective magnet 91, 92 and the magnetic material 93 are mutually fixed by an adhesive, for example. The outer peripheral side of the first magnet 91 in the magnet portion 42 is opposite to the stator 50, and the magnetic material 93 is provided in an opposite side of the stator 50 (anti-stator side) between both sides of the first magnet 91 in the radial direction.

Figure 17:
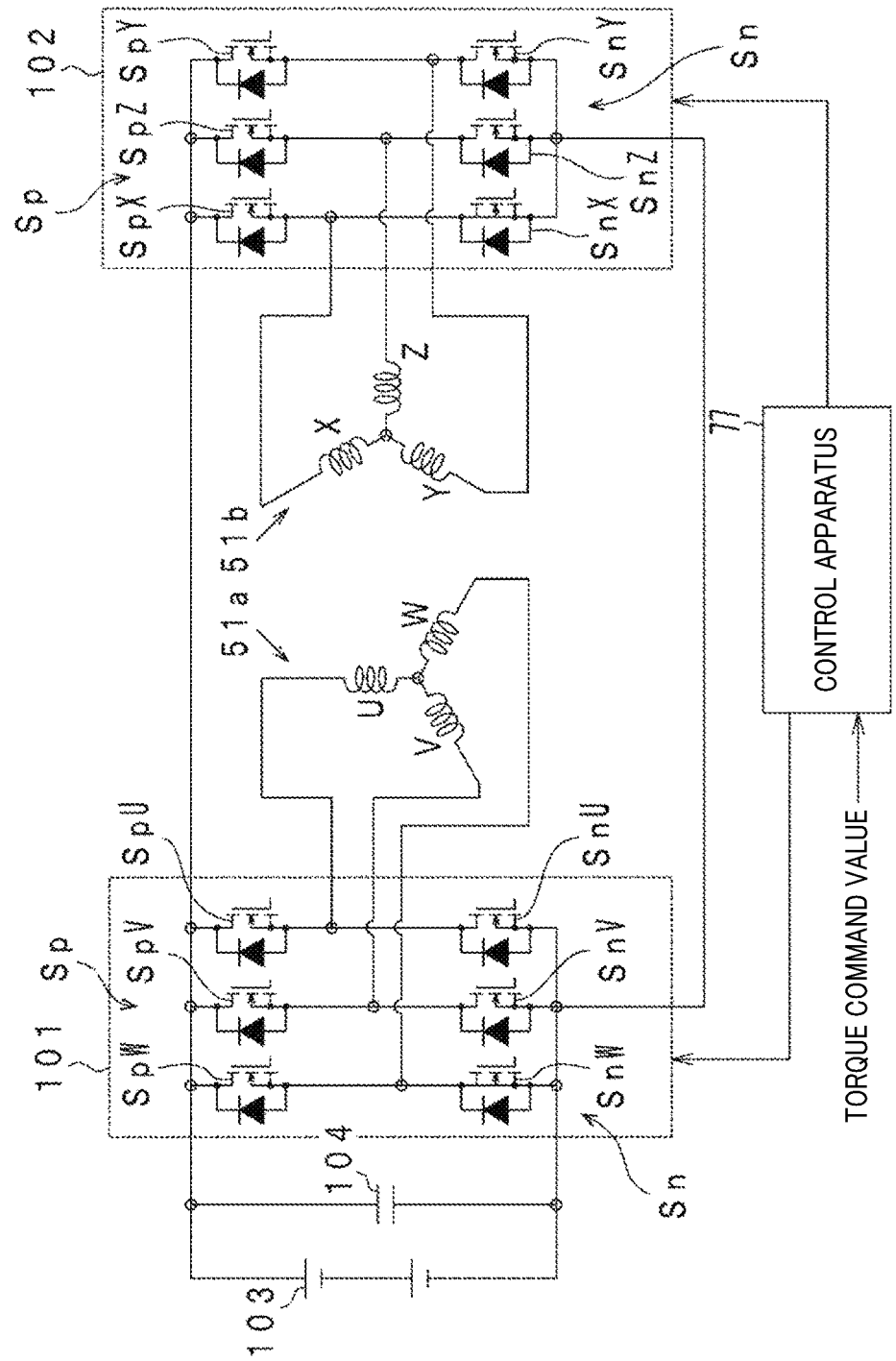
FIG. 17 is an electrical circuit diagram showing a control system of a rotary electric machine.
Figure 18:
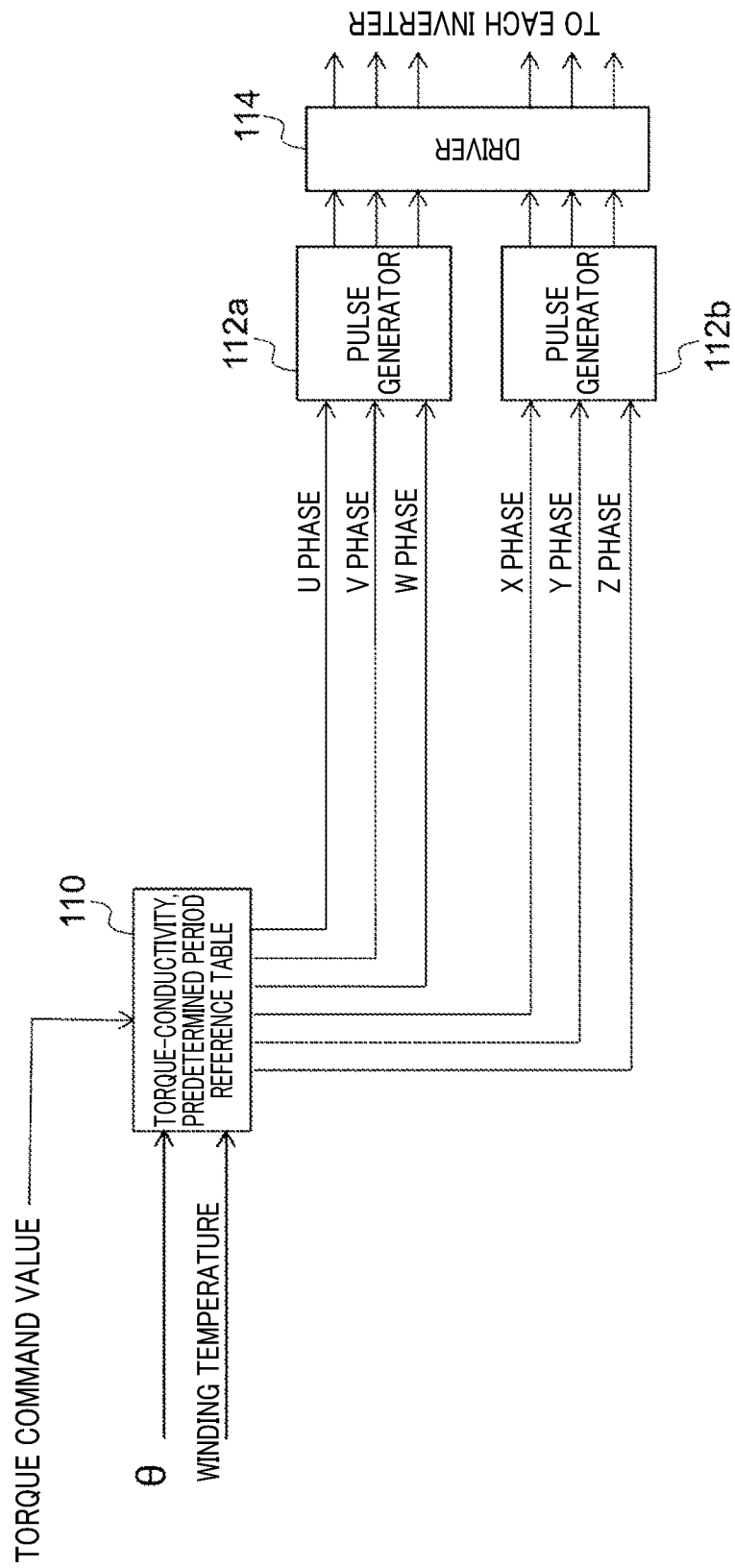
FIG. 18 is a block diagram showing a control process that controls respective phase currents of U, V, W, X, Y, and Z phases.

Next, a configuration of a control system that controls the rotary electric machine 10 will be described. FIG. 17 is an electrical circuit diagram of the control system of the rotary electric machine 10 and FIG. 18 is a functional block diagram showing a control process executed by the control unit 77.

In FIG. 17, as a stator winding 51, two pairs of three-phase windings 51a and 51b are shown, in which the three-phase winding 51a is composed of a U-phase winding, a V-phase winding and a W-phase winding, the three-phase winding 51b is composed of a X-phase winding, a Y-phase winding and a Z-phase winding. A first inverter 101 and a second inverter 102 are provided for the three-phase windings 51a and 51b, respectively. The inverters 101 and 102 are configured by a full-bridge circuit including an upper arm switch Sp and a lower arm switch Sn provided for the same number of phases. The switches (semiconductor switching elements) disposed in respective arms are switched between ON and OFF, thereby adjusting energization current of respective phase windings of the stator winding 50. Note that respective switches of the inverters 101 and 102 correspond to the semiconductor module 66.

In each of the inverters 101 and 102, a DC power source 103 and a smoothing capacitor 104 are connected in parallel. The DC power source is configured of, for example, a battery pack in which a plurality of battery cells are connected in series. The smoothing capacitor 104 corresponds to the capacitor module 68 shown in FIG. 1 and the like.

The control unit 77 is provided with a microprocessor including a CPU and various memory units, performing conduction control with ON-OFF switching of the respective switches in the inverters 101 and 102, in accordance with various detection information in the rotary electric machine 10 or requirements of power running and power generation. The detection information of the rotary electric machine 10 includes a rotation angle (electrical angle information) of the rotor 40 which is detected by an angle detection device such as a resolver, and a power source voltage (inverter input information) detected by a voltage sensor. The control unit 77 generates an operation signal for operating respective switches of the inverters 101 and 102 and outputs them.

The first inverter 101 a series-connected body of an upper arm switch Sp and a lower arm switch Sn in each of three phases U, V, and W. A high voltage side terminal of the upper arm switch Sp in each phase is connected to the positive terminal of the DC power source 103, and the low voltage side terminal of the lower arm switch Sn in each phase is connected to the negative terminal (ground) of the DC power source 103. One end of the U-phase winding is connected to an intermediate point between the upper arm switch SpU and the lower arm switch SnU, one end of the V-phase winding is connected to an intermediate point between the upper arm switch SpV and the lower arm switch SnV, and one end of the W-phase winding is connected to an intermediate point between the upper arm switch SpW and the lower arm switch SnW. These respective phase windings are star-connected (i.e. Y-connection), and other ends of the respective windings are mutually connected at the neutral point.

The second inverter 102 has a similar configuration to that of the first inverter 101, including a series-connected body of an upper arm switch Sp and a lower arm switch Sn in each of three phases U-phase, V-phase and W phase. A high voltage side terminal of the upper arm switch Sp in each phase is connected to the positive terminal of the DC power source 103, and the low voltage side terminal of the lower arm switch Sn in each phase is connected to the negative terminal (ground) of the DC power source 103. One end of the X-phase winding is connected to an intermediate point between the upper arm switch SpX and the lower arm switch SnX, one end of the Y-phase winding is connected to an intermediate point between the upper arm switch SpY and the lower arm switch SnY, and one end of the Z-phase winding is connected to an intermediate point between the upper arm switch SpZ and the lower arm switch SnZ. These respective phase windings are star-connected (i.e. Y-connection), and other ends of the respective windings are mutually connected at the neutral point.

FIG. 18 shows a control process that controls respective phase currents of U, V, W phases, and a control process that controls respective phase currents of X, Y, Z current. Firstly, the control process for the U, V, W phase side will be described.

The control unit 77 is provided with a reference table (torque-conduction ratio, predetermined period reference table) which stores information on a predetermined conduction ratio of each of the upper arm switch Sp and the lower arm switch Sn for rotating the rotary electric machine with a torque command value included in a command signal transmitted from a upper control unit, and information on a predetermined period for driving the upper arm switch Sp and the lower arm switch Sn at the predetermined conduction ratio. Specifically, the reference table stores information about a relationship between the predetermined conduction ratio and the torque command value and information about a relationship between the predetermined period and the torque command value. In the reference table, a period starting point and a period ending point are set depending on the magnetic pole position θ of the rotor 40. Note that the reference table may store information about a relationship between the predetermined conduction ratio and a current command value and information about a relationship between the predetermined period and the current command value. In the case where the command signal transmitted from the upper control unit includes a current command value instead of a torque command value, the reference table storing the information about a relationship between the predetermined conduction ratio and the current command value and the information between the predetermined period and the current command value is used to determine the predetermined conduction ratio and the predetermined period.

An effective voltage of the power supplied to the rotary electric machine 10 varies based on the relationship between the voltage of the DC power source 103 and the predetermined conduction ratio. Hence, the control unit 77 may adjust, depending on the voltage of the DC power source 103 (hereinafter abbreviated as power source voltage) detected by a voltage sensor (now shown), the predetermined conduction ratio determined by referring to the above-described reference table. For example, when the power source voltage is higher than the reference value, the determined predetermined conduction ratio is set to be smaller, and when the power source voltage is lower than the reference value, the determined predetermined conduction ratio is set to be larger, thereby adjusting the effective voltage of the power supplied to the rotary electric machine 10. The adjustment of the predetermined conduction ratio is performed by using a voltage reference table prepared in advance in which a relationship between the power source voltage and the predetermined conduction ratio is defined.

According to the present embodiment, the conduction ratio is defined as a ratio of High pulse period during the switching elements (upper arm switch Sp and lower arm switch Sn) of the inverters 101 and 102 turning ON to one period of the voltage waveform generated in the PWM control. One period of the voltage waveform generated in the PWM control is a sum of the above-described High pulse period and a period where no pulse is generated when the above-described switching element turn OFF. Since the conduction ratio is defined as a ratio of a pulse period of the voltage to one period of the voltage waveform, the conduction ratio may be sometimes expressed as a percentage. According to the present embodiment, basically, the conduction ratio is expressed as a numerical value ranging from 0 to 1 inclusive. However, a percentage expression may be used for intuitive understanding.

The inverters 101 and 102 generate power supplied to phase windings in respective phases by turning the upper arm switch Sp and the lower arm switch Sn as the switching elements of the inverters 101 and 102 to be ON and OFF in accordance with the conduction ratio calculated by the control unit 77.

The control unit 77 refers the above-described reference table and generates an operation signal indicating the conduction ratio and the predetermined period based on the received torque command value and magnetic pole position θ of the rotor 40. The period starting point and the period ending point are determined based on the magnetic pole position θ of the rotor 40.

For generating the operation signal, a temperature of the winding in each of the U-phase, V-phase and W-phase is considered. For example, in the case where the winding temperature is larger than or equal to a predetermined threshold, an operation signal can be used in which at least one of the conduction ratio and the predetermined period is lower than that of when the winding temperature is less than the predetermined threshold. The winding temperature is acquired using an element for temperature detection such as a thermistor.

Further, in the case where the winding temperature is larger than or equal to a predetermined threshold, for example, the conduction ratio is set to be 0.5, or the conduction ratio of all elements (upper arm switch Sp and lower arm switch Sn) is set to be 0 until some period elapses after the winding temperature becomes lower than the predetermined threshold. Thus, the conduction ratio is lowered, whereby the load of the rotary electric machine 10 is reduced and the winding temperature is lowered.

The control unit 77 outputs the generated operation signal to a pulse generator 112*a*. The pulse generator 112*a* generates a PWM signal having a rectangular wave shape to turn the upper arm switch Sp and the lower arm switch Sn ON and OFF, and outputs the PWM signal to a driver 114.

Since the voltage of the PWM signal outputted by the pulse generator 112a is insufficient to turn the respective switching elements of the upper arm switch Sp and the lower arm switch Sn ON and OFF, the PWM signal is boosted by the driver 114. The boosted PWM signal is outputted to the inverter 101 as a drive signal.

In the above, the control process for the U, V, W phase side is described. For the X, Y, Z phase side, the control process is substantially the same as that of the U, V, W phase side excluding a process for generating the PWM signal by the pulse generator 112b, and therefore detailed explanation is omitted.

Figure 19:
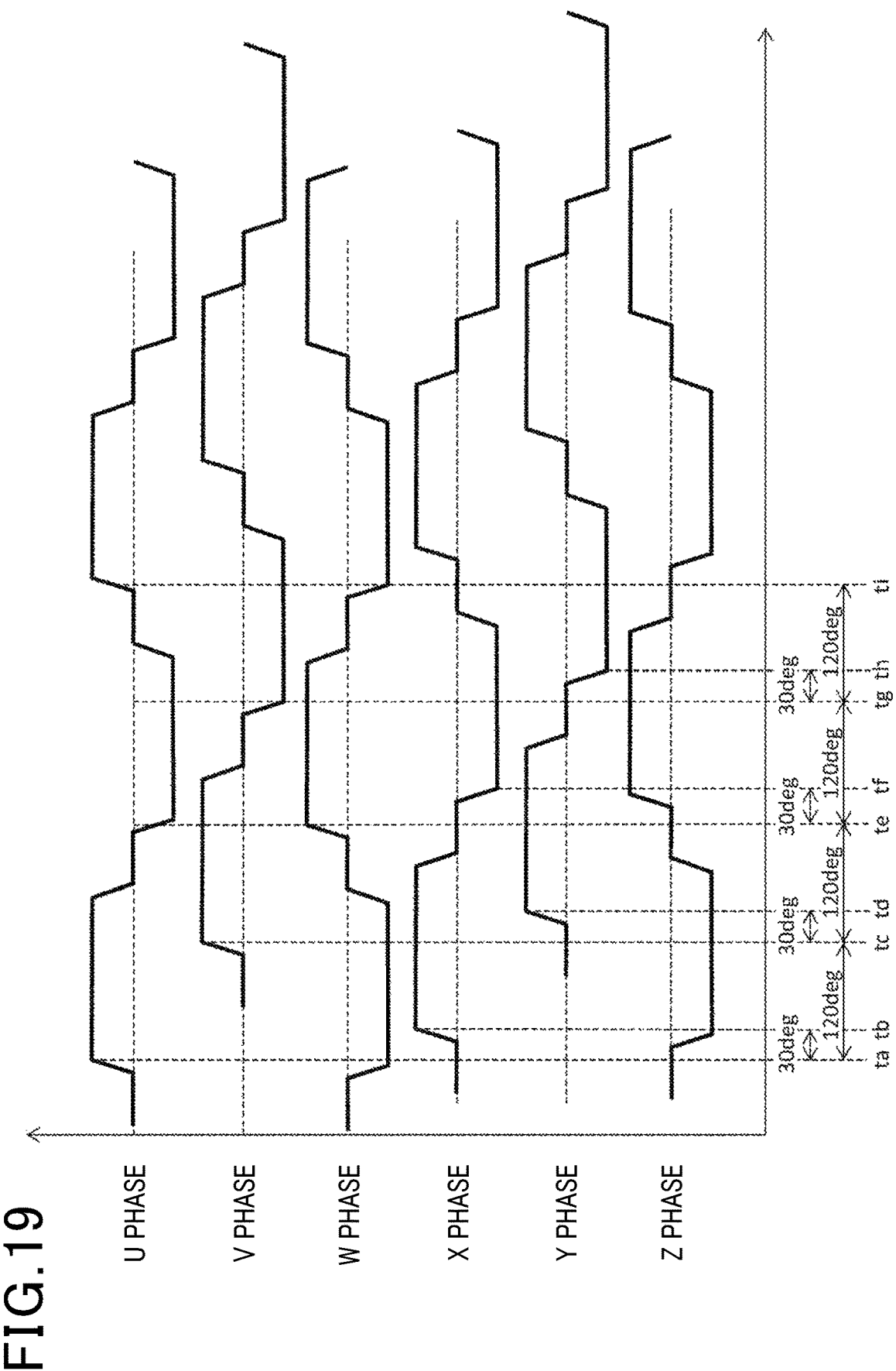
FIG. 19 is a timing diagram showing a conduction ratio command for respective phase currents of U, V, W, X, Y, and Z phases.

FIG. 19 is a timing diagram showing a conduction ratio command transmitted to each phase. The U, V, W phases have a phase difference of 120 degrees as an electrical angle, and the Y, W, Z phases have a phase difference of 30 degrees. The horizontal axis in FIG. 19 shows a time corresponding to the electrical angle.

As shown in FIG. 19, when the upper arm switch SpU turns ON and the lower arm switch SnW turns ON at a time ta, power from the DC power source 103 is supplied to the W-phase winding from the U-phase winding.

When the upper arm switch SpX turns ON and the lower arm switch SnZ turns ON at a time tb where a time corresponding to the electrical angle 30 degrees elapses from the time ta, the power from the DC power source 103 is supplied to the Z-phase winding from the X-phase winding.

When the upper arm switch SpV turns ON at a time tc where a time corresponding to the electrical angle 120 degrees elapses from the time ta, power from the DC power source 103 is supplied to the W-phase winding from the U-phase winding and the W-phase winding.

When the upper arm switch SpY turns ON at a time td where a time corresponding to the electrical angle 30 degrees elapses from the time tc, power from the DC power source 103 is supplied to the Z-phase winding from the X-phase winding and the Y-phase winding.

When the upper arm switch SpW turns ON and the lower arm switch SnU turns ON at a time to where a time corresponding to the electrical angle 120 degrees elapses from the time tc, power from the DC power source 103 is supplied to the U-phase winding from the V-phase winding and the W-phase winding.

When the upper arm switch SpZ turns ON and the lower arm switch SnX turns ON at a time tf where a time corresponding to the electrical angle 30 degrees elapses from the time te, power from the DC power source 103 is supplied to the X-phase winding from the Y-phase winding and the Z-phase winding.

When the lower arm switch SnV turns ON at a time tg where a time corresponding to the electrical angle 120 degrees elapses from the time te, power from the DC power source 103 is supplied to the U-phase winding and the V-phase winding from the W-phase winding.

When the lower arm switch SnY turns ON at a time th where a time corresponding to the electrical angle 30 degrees elapses from the time te, power from the DC power source 103 is supplied to the X-phase winding and the Y-phase winding from the Z-phase winding.

After the time ti where a time corresponding to the electrical angle 120 degrees elapses from the time tg, the above-described power-supply operations from the time to are repeated.

Figure 20:
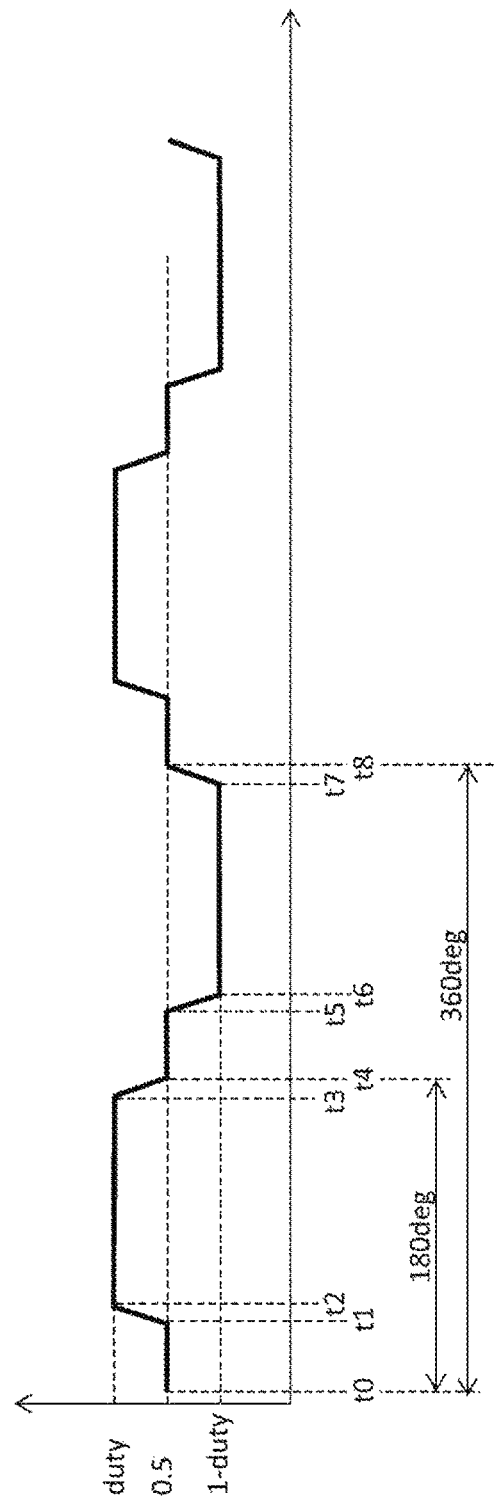
FIG. 20 is a timing diagram showing detailed changes in the conduction ratio of respective phases.

FIG. 20 shows a detailed change in the conduction ratio of the respective phases. The electrical angle 360 degrees as a basic unit is repeated to repeat the same state until the command value is changed. The conduction ratio has any value in a range from 0 to 1.0. A period (t0 to t1) refers to a break period having the conduction ratio 0.5. In a period of the conduction ratio 0.5, since the upper arm switch Sp and the lower arm transistor complementarily switches with the conduction ratio 0.5 showing a balanced state, an average amount of current of the windings is zero. Note that the switching frequency is constant through the entire period, and is set, for example, to 50 KHz. Since a tooth portion as a core member configured of magnetic material such as an iron core is not present in the stator winding 51, the inductance of the stator winding 51 is extremely small and the time constant of the winding is smaller than or equal to 0.2 msec. Hence, it is required to drive with a sufficiently high frequency. Note that a gap is generally provided between conductors of the stator winding 51 in the case of toothless configuration, however, a core member made of a non-magnetic material such as aluminum and resin may be provided instead of the gap.

According to the present embodiment, since the teeth portion is not present in the stator winding 51, a sufficiently high frequency is required for driving. However, the magnetic flux interlinking with the stator winding 51 flows through the gap without restriction and the interlinkage flux smoothly changes even in a case where the current waveform of the stator winding 51 is disturbed. Accordingly, as will be described later, noise and vibration of the rotary electric machine 10 is not so affected.

The command value DUTY refers to a conduction ratio required for outputting the predetermined torque, determined and stored in advance based on a performance measurement. The period (t1 to t2) refers to a gradual change period to change the conduction ratio to be from 0.5 to a DUTY value. If this period is longer, the response becomes worse. Hence, appropriate activation is required. The period (t2 to t3) refers to a predetermined period for driving with a DUTY value as a predetermined conduction ratio, in which the upper arm switch Sp and the lower arm switch Sn are complementarily driven with a DUTY value and a 1-DUTY value, respectively.

The complementary driving is, for a U-phase as an example, a case where the lower arm switch SnU is repeatedly switched ON and OFF with a conduction ratio 1-DUTY value complementarily to the upper arm switch SpU being repeatedly switched between ON and OFF with a DUTY value as a predetermined conduction ratio. Specifically, when the upper arm switch SpU is ON, the lower arm switch SnU is OFF, and when the upper arm switch SpU is OFF, the lower arm switch SnU is ON.

Figure 21:
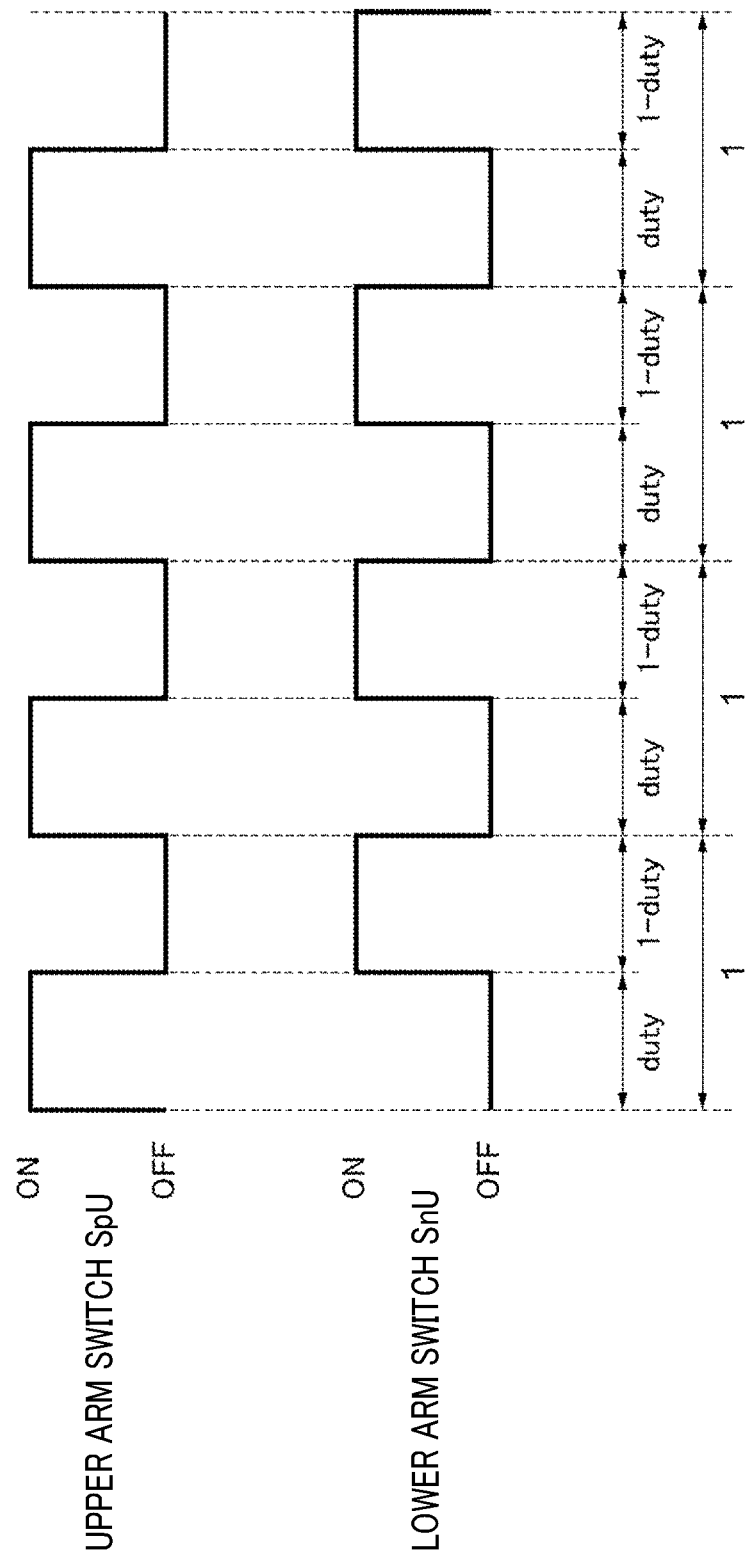
FIG. 21 is an explanatory diagram showing an example of an upper arm switch and a lower arm switch in a complementary driving operation.

FIG. 21 is an explanatory diagram showing an example of an operation of the upper arm switch SpU and the lower arm switch SnU in the complementary driving. According to the present embodiment, the conduction ratio of the upper arm switch SpU is DUTY when one period of the voltage waveform is 1, and the conduction ratio of the lower arm switch SnU is operating complementarily to the upper arm switch SpU. However, in the case where the upper arm switch SpU and the lower arm switch SnU simultaneously turn ON, the inverters 101 and 102 would be damaged. Accordingly, a minute so-called dead time is set in order to avoid the simultaneous switching ON of the upper arm switch Sp and the lower arm switch Sn. As a result, strictly, although the conduction ratio of the upper arm switch SpU is slightly lower than the DUTY and the conduction ratio of the lower arm switch SnU is slightly lower than (1-DUTY), according to the present embodiment, in order to simplify the explanation, the conduction ratio of the upper arm switch is described as DUTY and the conduction ratio of the lower arm switch the SnU is described as 1-DUTY for convenience. In FIG. 21, the U-phase is described. However, since the complementary driving operations for other phases, V-phase, W-phase, X-phase, Y-phase and Z-phase are the same as that of the U-phase, detailed explanation is omitted.

In the complementary driving operation, an eddy current may be generated in the U-phase winding when the upper arm switch SpU turns ON. However, the lower arm switch SnU is turned ON at a time when the upper arm switch SpU is turned OFF, whereby the generated eddy current can be released to the negative terminal (ground) of the DC power source 103 so that conduction loss can be minimized.

At the period (t2 to t3), the predetermined conduction rate of the upper arm switch Sp is constant as a value DUTY, and the conduction rate of the lower arm switch Sn is constant as a value 1-DUTY. According to the present embodiment, control in which a predetermined conduction ratio of the upper arm switch Sp and the conduction ratio of the lower arm switch Sn are each set to be constant in a predetermined period (t3-t2) or the like is referred to as a high-frequency conduction ratio constant control.

Note that the predetermined period (t3-t2) is set to be larger than or equal to 120 degrees and less than 180 degrees in electrical angle. When setting the predetermined period to be less than 120 degrees, a non-conduction period occurs on each phase so that torque performance cannot be achieved and also torque ripple occurs. When setting the predetermined period to be larger than or equal to 180 degrees, the upper arm switch Sp and the lower arm switch Sn simultaneously turn ON, causing a short-circuit between the inverters 101, 102 and the DC power source 103. This should be avoided.

The period (t3-t4) refers to a period where the conduction ratio is gradually changed from a value DUTY to 0.5, and a period (t4-t5) refers to a break period having the conduction ratio 0.5.

The period (t5 to t6) refers to a period where the conduction ratio is gradually changed from 0.5 to 1-DUTY, and a period (t5 to t7) refers to a period for driving with a predetermined value 1-DUTY. This is a complementary driving period where the upper arm switch Sp is driven with the conduction ratio as 1-DUTY and the lower arm switch Sn is driven with the conduction ratio as DUTY. This predetermined period (t6 to t7) may be set as same as the predetermined period (t3-t2). The period (t7 to t8) refers to a period where the conduction ratio is gradually changed from 1-DUTY to 0.5.

There is an assumption for the series of period, for example, a period (t4-t0) is set to be 180 degrees, and a period (t8 to t0) is set to be 360 degrees. For actual operation, similar to the above-described complementary driving, a minute dead time is set so as to prevent the upper arm switch Sp and the lower arm switch Sn from being simultaneously turned ON.

For this reason, generally, a minute break period is provided such that a conduction ratio of 0.49 is actually set in the case where the conduction ratio of 0.5 is predicted, for example.

In the case where a torque is required to be increased, the DUTY value is set to be larger and the predetermined period (t3-t2) may be set longer in a range larger than or equal to 120 degrees to less than 180 degrees. The DUTY value and the length of the predetermined period (t3-t2) may be independently set or subordinately set. Subordinately setting refers to a setting such that the predetermined period (t3-t2) is set to be longer when the DUTY value is set to be larger, or the DUTY value is set to be larger when the predetermined period (t3-t2) is set to be longer.

In FIG. 20, a predetermined period (t3-t2) and a predetermined period (t7-t6) subsequent to the predetermined period (t3-t2) have symmetry at 180 degrees period, that is, the predetermined period (t7-t6) and the predetermined period (t3-t2) are set to have the same length. According to this setting, since the rotary electric machine 10 can be operated stably and silently, and the upper arm switch Sp and the lower arm switch Sn are complimentarily driven, the conduction loss can be minimized. However, the predetermined period (t7-t6) and the predetermined period (t3-t2) can be set having different lengths as long as being used in an apparatus which is not affected by noise and vibration.

Figure 22:
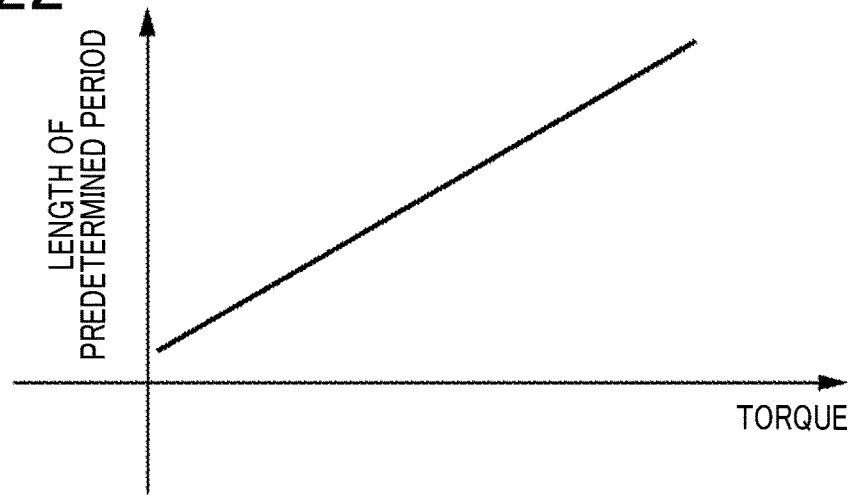
FIG. 22 is an explanatory diagram showing an example of a relationship between a torque and a predetermined period.

FIG. 22 is an explanatory diagram showing an example of relationship between the torque and the predetermined period length. As shown in FIG. 22, when increasing the torque, the length of the predetermined period (t3-t2) is set to be longer. In FIG. 22, a proportional relationship is present between the torque and the predetermined period length. However, a general rotary electric machine is not limited to this mode. The relationship between the torque and the predetermined period may be a non-linear relationship depending on the specification of the rotary electric machine. The specific mode is determined based on the specification of the rotary electric machine.

Figure 23B:
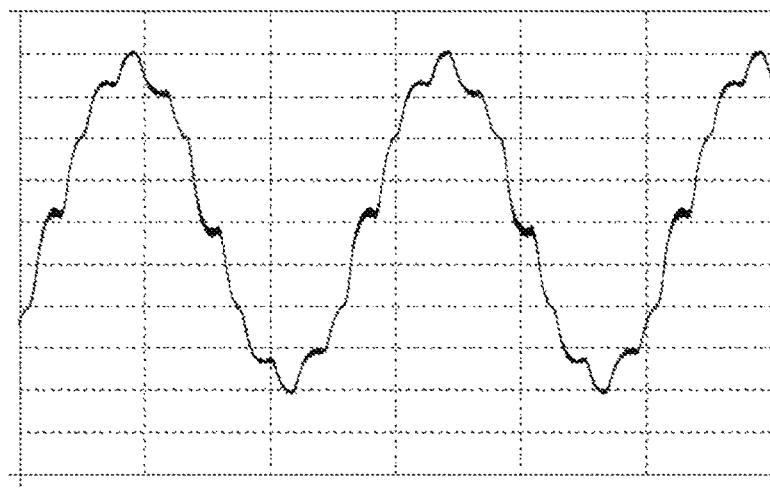
FIG. 23B is a diagram showing a current waveform when high-frequency conduction ratio constant control is applied, where the switching frequency is 50 KHz, a conduction ratio of the upper arm switch Sp is 0.75 (conduction ratio of lower arm switch Sn is 0.25), and a conduction ratio constant period corresponds to 120 degrees of electrical angle.

FIG. 23A shows conventional middle frequency PWM control, and FIG. 23B shows high-frequency conduction ratio constant control according to the present embodiment of the present disclosure. For the rotary electric machine 10, 200 seconds of the time constant is used for the windings. FIG. 23A shows a waveform of a result in the case where sinewave PWM control with a switching frequency of 10 KHz is applied. FIG. 23B is a waveform of a result in the case where high-frequency conduction ratio constant control is applied with a switching frequency of 50 KHz, the conduction ratio of the upper arm switch Sp is 0.75 (conduction ratio of the lower arm switch Sn is 0.25), and a conduction ratio constant period of 120 degrees in electrical angle.

As shown in FIG. 23A, in the PWM control, a current feedback is successively performed such that an envelope relatively close to sinewave is obtained. However, since the current pulsation at each switching is large and the frequency is high, the loss becomes large in the inverter and the motor core. When the switching frequency is increased further, the A/D conversion for the detection value of the current sensor cannot follow the high switching frequency and current controllability is lost.

On the other hand, according to the present embodiment, as shown in FIG. 23B, since it is not necessary to apply current feedback control using the A/D conversion of the detection value of the current sensor, even if low order current distortion occurs, current pulsation at each switching is reduced $\frac{1}{10}$ compared to the PWM control with the current feedback control. Hence, high frequency loss can be reduced.

The control unit 77 is not limited to a configuration in which only high frequency conduction ratio constant control can be performed. In other words, in addition to the high frequency conduction ratio constant control, the control unit 77 may perform a current feedback control when the high frequency conduction ratio constant control is not used. When performing the current feedback control, although the current sensor and the A/D converter are required to be used, the redundancy can be enhanced and control methods can be selected depending on the state.

The low order current distortion shown in FIG. 23B is caused by low order higher harmonic. However, the low order current distortion caused by low order higher harmonic does not affect operation in practical use. This is because, since no tooth portions are present in the stator 50, so that the relative permeability in the gap is about 1.0, the magnetic flux flows through the gap freely because no spatial constrain exists for allowing the magnetic flux to flow and appropriately equalized. As a result, the waveform of the magnetic flux inter in with the winding is smoothed and discomfort caused by vibration noise caused by the low order current distortion is reduced.

Figure 24:
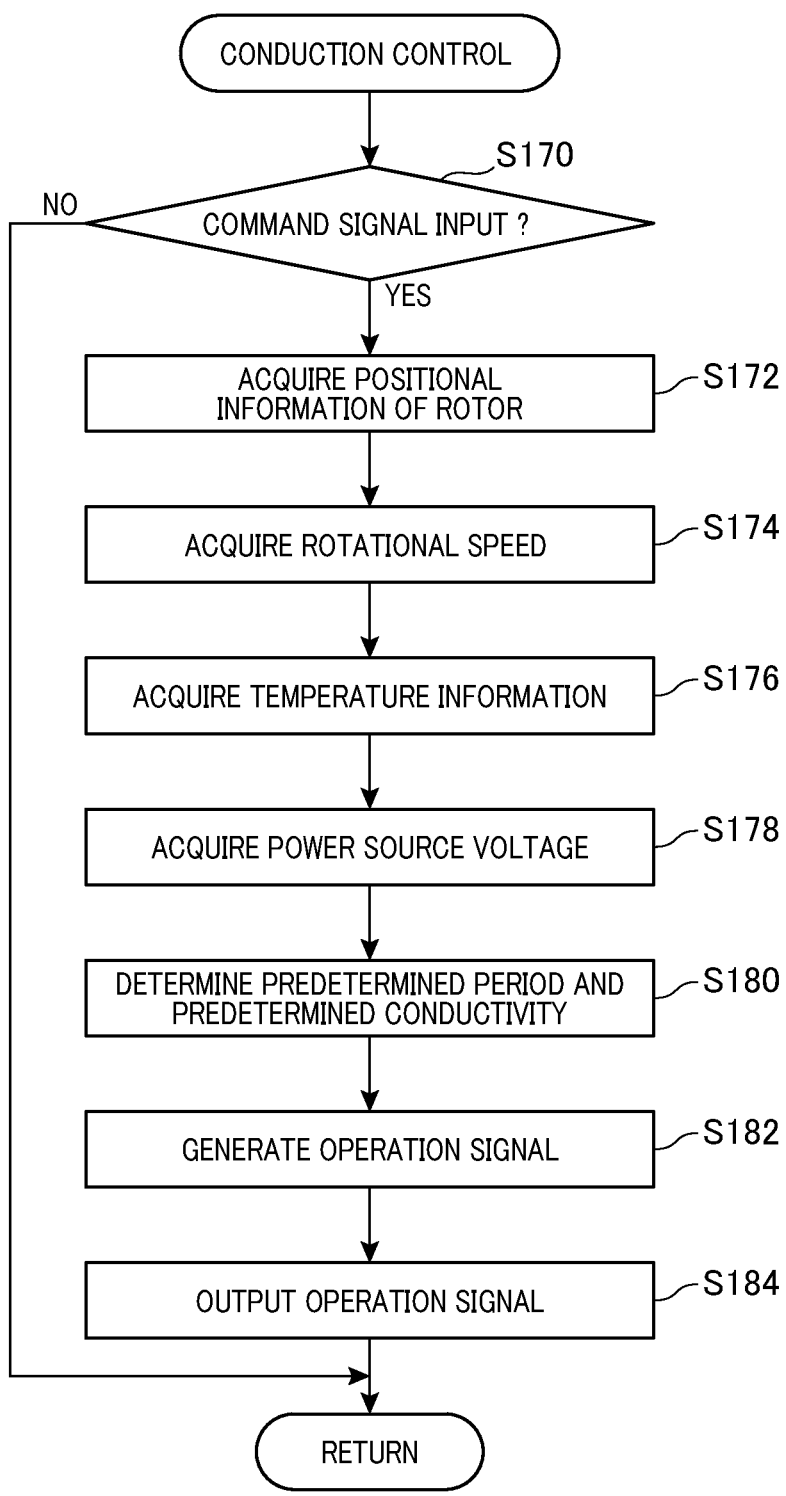
FIG. 24 is a flowchart showing an example of conduction control.

FIG. 24 is a flowchart showing an example of a process of conduction control according to the present embodiment of the present disclosure. At step 170, the process determines whether the control unit receives a command signal transmitted from an upper control unit of the control unit 77, and proceeds to step 172 when determined that the command signal is received, otherwise the process returns.

At step 172, the process acquires the magnetic pole position θ as positional information of the rotor 40. The magnetic pole position θ is extracted from a signal outputted by an angle detection unit such as resolver, a TMR sensor or a Hall sensor. At step 174, the process acquires a rotational speed of the rotor 40 based on a signal outputted by the angle detection unit or the like.

At step 176, the process acquires the temperature information of the winding. The temperature information is acquired by using a temperature detecting device such as a thermistor. At step 178, the process acquires the power source voltage of the DC power source 103.

At step 180, the process determines the predetermined period and the predetermined conduction ratio. The predetermined period and the predetermined conduction ratio are determined referring to the above-described reference table such that the larger the torque command value indicated by the command signal transmitted from the upper control unit, the longer the predetermined period and the larger the predetermined conduction ratio are, and the smaller the torque command value, the shorter the predetermined period and the smaller the predetermined conduction ratio are. A period starting point and a period ending point of the predetermined period are set depending on the magnetic pole position θ of the rotor 40 acquired at step 172. A change in the phase at a timing including the period starting point and the period ending point of the predetermined period is determined depending on the rotational speed acquired at step 174. The predetermined conduction ratio determined using the reference table is adjusted depending on the power source voltage acquired at step 178. The adjustment of the predetermined conduction ratio is performed by using the voltage reference table in which a relationship between the power source voltage and the predetermined conduction ratio is defined. Further, in the case where the winding temperature acquired at step 176 is larger than or equal to a predetermined threshold, at least one of the conduction ratio and the predetermined period is set to be lower compared to a case where the winding temperature is lower than the predetermined threshold.

At step 182, the process generates an operation signal indicating the received torque command value, the conduction ratio and the predetermined period based on the winding temperature and the power source voltage, and a phase depending on the magnetic pole position θ of the rotor 40 and the rotational speed of the rotor 40. Then, at step 184, the process outputs the generated operation signal to the pulse generators 112a and 112b and the process returns.

As described, according to the present embodiment, in the predetermined period (t3-t2) shown in FIG. 20, the predetermined conduction ratio of the upper arm switch Sp is controlled to be constant, and the conduction ratio of the lower arm switch which operates complementarily relative to the upper arm switch Sp is controlled to be constant, whereby current pulsation at each switching of the inverters 101 and 102 is reduced.

Further, according to the present embodiment, the predetermined conduction ratio of the upper arm switch Sp is controlled to be constant, and the conduction ratio of the lower arm switch Sn which complementarily operates relative to the upper arm switch Sp is controlled to be constant, whereby no current feedback control using the current sensor is required so that the switching operation can be faster. Hence, high-frequency conduction ratio constant control capable of reducing current pulsation at each switching can be performed.

As a result, according to the present embodiment, a control apparatus and a control method of a rotary electric machine capable of performing stable rotation control in a rotary electric machine, having a toothless winding, can be obtained.

Second Embodiment

Next, a second embodiment will be described. The present embodiment differs from the first embodiment in that a voltage adjusting unit 212 is provided between the DC power source 103, and the inverters 101 and 102. However, since the configurations other than the voltage adjusting unit 212 and the control unit 177 are the same as those in the first embodiment, reference numbers which are the same as the first embodiment are applied to configurations that are the same as those in the first embodiment, and the detailed explanation thereof will be omitted.

Figure 25:
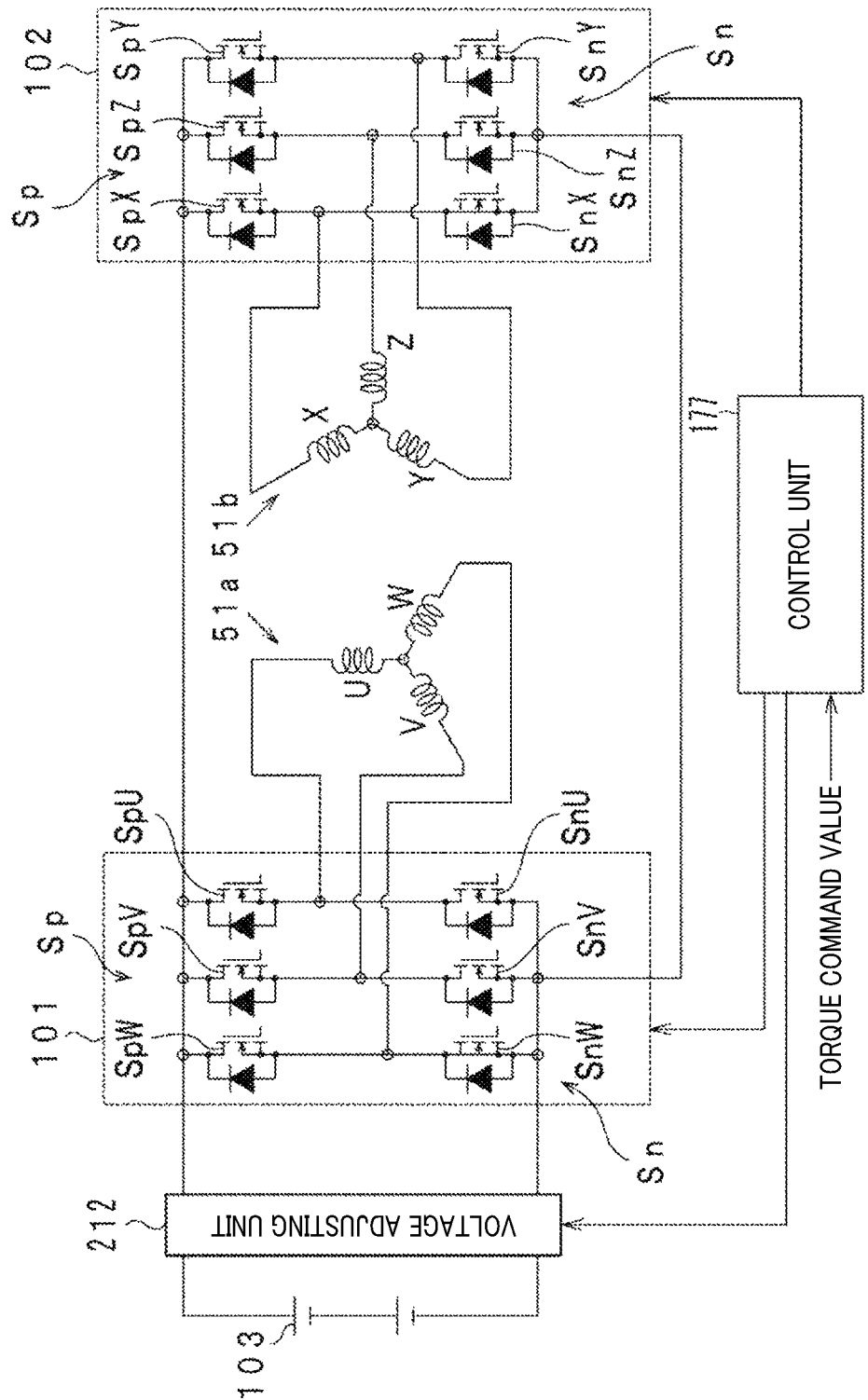
FIG. 25 is an electrical circuit diagram of a control system of a rotary electric machine according to a second embodiment.
Figure 26:
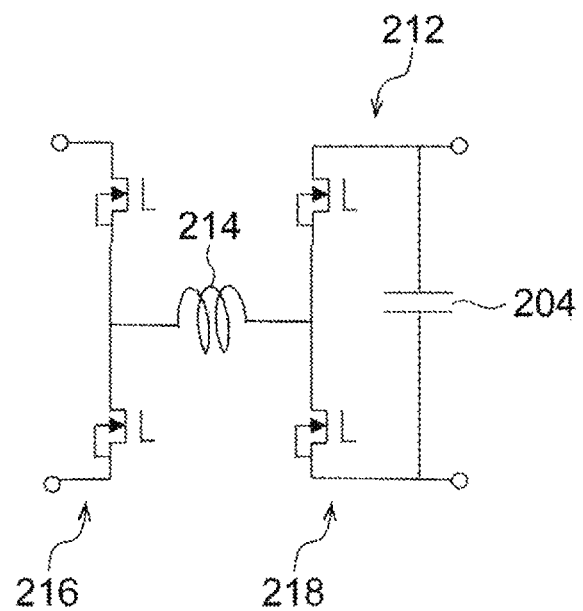
FIG. 26 is an electrical circuit diagram showing a voltage adjusting unit.

FIG. 25 shows a circuit configuration of a control system according to the present embodiment. As shown in FIG. 26, the voltage adjusting unit 212 is configured as a chopper circuit composed of a reactor 214, respective switching elements of a switching element 216 in the DC power source 103 side and a switching element 218 in the inverter 101 side, that is, a so called H-bridge boost converter.

The output voltage of the voltage adjusting unit 212 is determined by the conduction ratio of the respective switching elements. Since the H-bridge boost converter is publicly known, explanation of a detailed operation theory is omitted and the way the bridge circuit is utilized for the embodiments of the present embodiments will be described.

According to the present embodiment, in the predetermined period (t3-t2) shown in FIG. 20, the respective switching elements in the inverter 101 and 102 side do not perform the switching but perform so-called rectangular wave voltage driving. In other words, the conduction ratio of value DUTY of the upper arm switch Sp is maintained at 1.0 until a time corresponding to 180 degrees period as the maximum electrical angle. Since the upper arm switch Sp and the lower arm switch Sn are inverted after a timing corresponding to 180 degrees, the conduction ratio (1-DUTY) of the lower arm switch Sn is controlled to be 1.0 in the remaining 180 degrees period, and the conduction ratio of the upper arm switch Sp is controlled to be DUTY=0.0. In this state, the power source voltage is terminated with the winding impedance, and an excessive current is expected to flow. Hence, voltage to be applied to the winding is adjusted by the voltage adjusting unit 212, thereby setting an appropriate current value. The appropriate current value and the voltage to be applied are controlled using the reference table stored in the control unit 77. The control unit 177 performs successive voltage control referring to the reference table. As an example, according to the reference table, the voltage value outputted by the voltage adjusting unit 212 with respect to the torque command value or the current command value are set for each predetermined rotational speed.

Since the time constant of the winding is sufficiently small, current flow immediately after the switching-ON with the conduction ratio 1 (100%) is a step response of an LR circuit (integrating circuit) producing the final arrival current value in accordance with Ohm's law Vt/R where the application voltage is Vt, and the resistance of the winding is R, even though the rising time is slightly delayed. In other words, since the current value is determined by Vt, Vt may be determined in advance based on the required amount of current.

For a line voltage, as the maximum value, the output voltage Vt of the voltage adjusting unit 212 is applied. In the case where the stator winding 51 is configured as a three-phase Y-connection, a voltage of Vt/1.732 is applied as a phase voltage, and the arrival current value of the phase current is Vt/1.732R. Since the winding resistance is changed by self-heating due to energization, the temperature may be detected using a temperature detecting device to apply voltage correction.

Recently, some reports say that the switching of the voltage adjusting unit 212 is performed at around 100 KHz. Unlike the motor winding, the reactor 214 is desired to be smaller with a single phase winding, and a higher switching frequency is utilized so as to reduce the size. Further, for the core material of the reactor 214, dedicated materials have been developed adapted for ultra high frequency use. This dedicated core material can be applied to the reactor 214, whereby the power conversion efficiency can be improved.

According to the present embodiment, the voltage adjustment by the voltage adjusting unit 212 and the three-phase driving by the inverters 101 and 102 are separately designed as a dedicated design. Hence, the power conversion efficiency of the power supplied to the windings can be improved.

Also, according to the present embodiment, in the inverter 101 and 102 side, the switching elements are not switched so that switching loss does not occur. Hence, the surge voltage can be also reduced. In the inverter 101 and 102 side, since it is not necessary to perform current detection, or DQ conversion for determining the phase of the voltage applied to the winding, processing load can be reduced.

Figure 27:
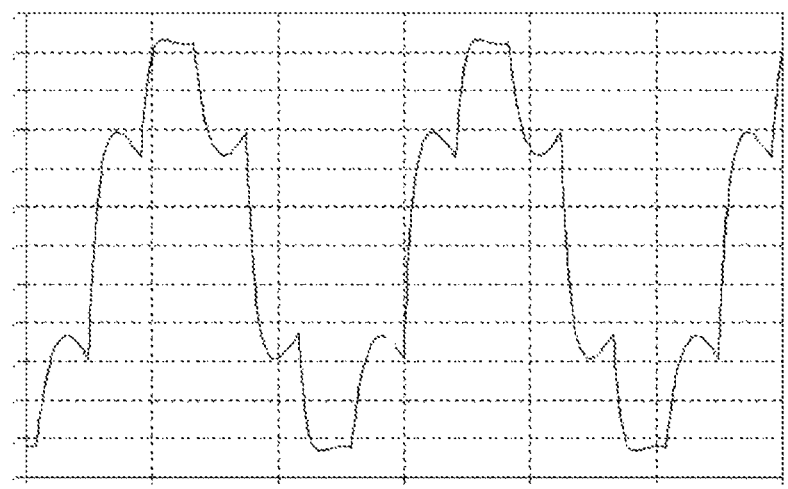
FIG. 27 is a diagram showing a current waveform according to a second embodiment.

FIG. 27 is an explanatory diagram showing an example of a current waveform supplied to the rotary electric machine 10 according to the present embodiment. In the current waveform without performing the current feedback control according to the present embodiment, as shown in FIG. 27, no small current pulsation is observed.

Although the low order high harmonic is larger than that of the first embodiment shown in FIG. 23B, the relative permeability in the gap is about 1.0 since no tooth portion is present in the stator 50 according to the present embodiment. Hence, since the magnetic flux flows through the gap because no spatial constrain exists for flowing the magnetic flux and appropriately equalized, the waveform of the magnetic flux interlinking with the winding is smoothed. Accordingly, with such a content percentage in the waveform shown in FIG. 27, discomfort due to vibration noise is reduced.

As described, according to the present embodiment, in the predetermined period (t3-t2) shown in FIG. 20, respective switching elements in the inverter 101 and 103 side do not perform switching but perform so-called rectangular wave voltage driving without the current feedback control and the DQ conversion, whereby current pulsation at each switching by the inverters 101 and 102 is suppressed.

According to the present embodiment, since no current feedback and no DQ conversion using the current sensor are required, the processing load of the control unit can be reduced and the switching operation can be faster.

As a result, according to the present embodiment, a control apparatus and a control method of a rotary electric machine capable of performing a stable rotation control in a rotary electric machine having a toothless winding, can be obtained.

Note that outer rotor type apparatuses are described in the first and second embodiments but inner rotor type apparatuses can be utilized.

Modification

Figure 28:
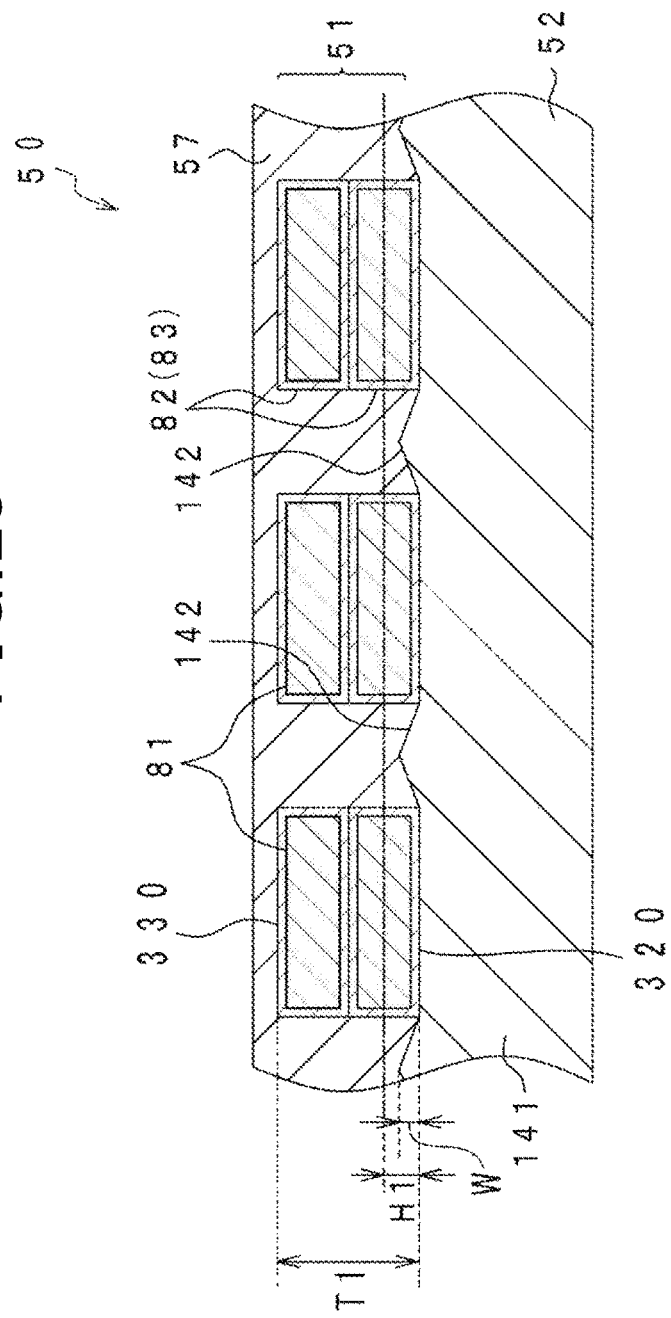
FIG. 28 is a diagram showing a cross-sectional view of a stator in a modification example according to the first embodiment and the second embodiment.

According to the first embodiment and the second embodiment, the outer peripheral surface of the stator core 52 is formed to have a curved surface without a convex-concave shape, and a plurality of conductor groups 81 are arranged on the outer peripheral surface at predetermined intervals. However, this configuration may be modified. For example, as shown in FIG. 28, the stator core 52 may be provided with a yoke 41 having an annular shape disposed in an opposite side (lower side in FIG. 28) of the rotor 40 in the both sides of the stator winding 41 in the radial direction, and protrusions 142 each protruding to extend from the yoke 141 towards a portion between adjacent linear portions 83. The protrusions 142 are provided in a portion radially outside, that is, the rotor 40 side at predetermined intervals. The respective conductor groups 81 of the stator winding 51 are engaged with the protrusions 142 in the circumferential direction, and arranged in the circumferential direction while using the protrusions 42 to be alignment portions of the conductor groups 81. Note that the protrusions 142 correspond to inter-conductor members.

For each protrusion 142, a thickness dimension in the radial direction from the yoke 141, that is, a distance W from an inner side surface 320 of the linear portion 83 adjacent to the yoke 141 in the radial direction of the yoke 141 to the apex of the protrusion 142 is smaller than ½ (marked as H1 in FIG. 28) of the thickness dimension in the radial direction of the linear portion 83 adjacent to the yoke 141 in the radial direction, among the linear portions 83 in plural layers positioned inwardly and outwardly in the radial direction. In other words, a non-magnetic member (sealing member 57) may occupy ¾ of a region of the dimension (thickness) T1 of the conductor group 81 (conductive member) in the thickness direction of the stator winding 51 (stator core 52), that is, double the thickness of the conductor 82 (i.e. the shortest distance between the surface 320 contact with the stator core 52 of the conductor group 81 and the surface 330 of the conductor group 81 facing the rotor 40. Thus, according to such a restriction of the thickness of the protrusion 142, the protrusions 142 cannot serve as teeth between mutually adjacent conductor groups 81 (i.e. linear portions 83) such that a magnetic path of the teeth is not formed. Each protrusion 142 may not be provided at all intervals between respective conductor groups 81 arranged in the circumferential direction, but may be provided at least between one pair of conductor group 81 adjacently positioned in the circumferential direction. For example, the protrusion 142 may be provided at the same interval for each predetermined number of intervals between respective conductor groups 81 in the circumferential direction. The shape of the protrusion 142 may be any shape such as a rectangular shape or arc shape.

In the outer peripheral surface of the stator core 52, the linear portion 83 may be provided as a single layer. Therefore, the thickness dimension of the protrusion 142 in the radial direction may be smaller than ½ of the thickness dimension of the linear portion 83 in the radial direction.

In the case where a virtual circle is assumed in which the center thereof is defined as the axial center of the rotary shaft 11, passing through the center position of the linear portion 83 in the radial direction, the protrusion 142 may have a shape protruding from the yoke 141 within a range of the virtual circle, that is, a shape not protruding further radially outward (i.e. to the rotor 40 side) than the virtual circle is positioned.

According to the above-described configuration, since the thickness dimension of the protrusion 142 in the radial direction is restricted such that the protrusion 142 does not function as a tooth portion between adjacent linear portions 83 in the circumferential direction, respective adjacently positioned linear portions 83 can be positioned to be close compared to a case where the tooth portion is provided between respective linear portions 83. Thus, cross-sectional area of the conductor 82a can be expanded and heat produced in accompanying with the energization of the stator winding 51 can be reduced. According to this configuration, since no tooth portion is present, magnetic saturation can be avoided, and the energization current supplied to the stator winding can be increased. This can deal appropriately with an increase in the produced heat accompanying with an increase in the energization current. In the stator winding 51, the turn portion 51 is shifted in the radial direction and an interference avoiding portion is included to avoid interference with other turn portions 84. Hence, mutually different turn portions 84 can be disposed apart from each other in the radial direction. Thus, heat dissipation can be improved for the turn portion 84 as well. As described, heat dissipation properties of the stator winding 50 can be appropriately obtained.

As long as the yoke 141 of the stator core 52 and the magnet portion 42 (i.e. each magnet 91, 92) of the rotor 40 are positioned apart by a predetermined distance or more, the thickness dimension of the protrusion 142 in the radial direction is not limited to H1 as shown in FIG. 28. Specifically, if the yoke 141 and the magnet 42 are positioned apart by 2 mm or more, the thickness dimension of the protrusion 142 in the radial direction may be larger than or equal to H1 shown in FIG. 28. For example, in the case where the thickness dimension of the linear portion 83 in the radial direction exceeds 2 mm and the conductor groups 81 are configured of conductors 82 in two layers positioned inward and outward in the radial direction, the protrusion 142 may be provided to expand up to the linear portion 83 positioned not adjacently to the yoke 141, that is, halved position of the conductor 82 at second later from the yoke 141. In this case, when the thickness dimension of the protrusion 142 in the radial direction is in a range of "H1×3/2", at least the above-described effects can be obtained by increasing the cross-sectional area of the conductor in the conductor group 81.

Figure 29:
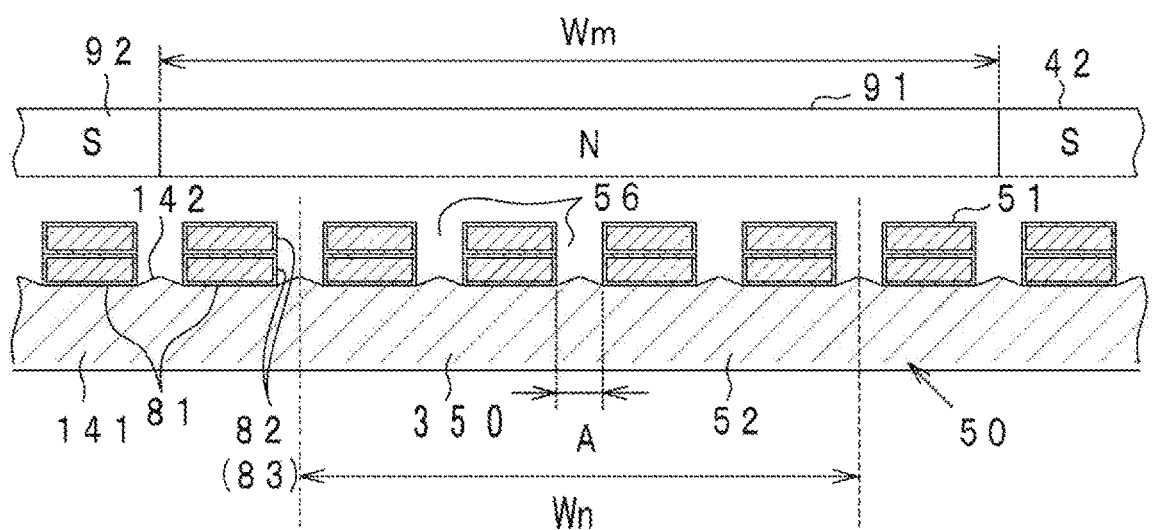
FIG. 29 is a diagram showing a cross-sectional view of a stator and a magnet portion in a modification example according to the first embodiment and the second embodiment.

Also, the stator core 52 may have a configuration shown in FIG. 29. In FIG. 29, the sealing member 57 is omitted, but the sealing member may be provided. In FIG. 29, for the sake of convenience, the magnet portion 42 and the stator core 52 are shown as a linearly developed view.

According to the configuration shown in FIG. 29, the stator 50 includes a protrusion 142 as an inter-conductor member between conductors 82 (i.e. linear portions 83) adjacently positioned in the circumferential direction. The stator 50 functions magnetically with one of magnetic poles (N pole or S pole) of the magnet portion 42 when the stator winding 51 is energized, and includes a portion 350 extending in the circumferential direction of the stator 50. The protrusion 142 is constituted to satisfy the following equation (1), where the length of the portion 350 in the circumferential direction of the stator 50 is Wn, a total width of the protrusions 142 existing in the length range Wn (i.e. total dimension in the circumferential direction of the stator 50 of portions between conductors corresponding to one magnetic pole of the rotor) is Wt, a saturation magnetic flux density of the protrusion 142 (or a saturation magnetic flux density of the inter-conductor member) is Bs, a width dimension in the circumferential direction corresponding to one pole of the magnet portion 42 is Wm, and a residual magnetic flux density of the magnet portion 42 is Br.

$$Wt \times Bs \leq Wm \times BR \quad (1)$$

The length range Wn is set to include a plurality of conductor groups 81 in which the excitation timings are overlapped, among a plurality of conductor groups 91 adjacently positioned in the circumferential direction. At this time, the center of the gap 56 in the conductor groups 81 may preferably be set as a reference (boundary) when the length range Wn is set. For example, in the case of a configuration exemplified in FIG. 29, up to four conductor groups in order from the shortest distance from the magnet pole center of the N pole in the circumferential direction correspond to the plurality of conductor groups 81. Then, the length range Wn is set to include the four conductor groups 81. Note that the end portions (start portion and end portion) of the length range Wn are set to be in the center of gaps 56.

In FIG. 29, since half of the number of protrusions 142 are included in each of both end portions of the length range W, a total of four protrusions 142 are included in the length range Wn. Hence, the total width of the protrusions 142 included in the length range Wn is Wt=½A+A+A+A+½A=4A, where A is width of each protrusion 142 (i.e. dimension of the protrusion 142 in the circumferential direction of the stator 50, or an interval between adjacent conductor groups 81).

Specifically, according to the present embodiment, the three-phase winding of the stator winding 51 is configured as a distributed winding. In the stator winding 51, the number of protrusions 142 for one pole of the magnet portion 42, that is, the number of gaps 56 between respective conductor groups 81 is "the number of phases×Q". Here, Q refers to the number of conductors 82 in contact with the stator core 52. In the case where the conductors 82 are stuck in the radial direction of the rotor 40 to constitute the conductor group 81, the number of protrusions is the same as the number of conductors 82 in the inner peripheral side of the conductor group 81 per one phase. In this case, respective three-phase windings of the stator winding 51 are energized in a predetermined order, and the protrusions 142 corresponding to two phases in the one pole are excited. Hence, in a range Wm corresponding to one pole of the magnet portion 42, the total width dimension Wt in the circumferential direction of the protrusions 142 which is excited by the energization of the stator winding 51, is "the number of phases to be excited×Q×A=2×2×A", where the width dimension of the protrusion 142 (i.e. gap 56) in the circumferential direction is A.

Then, under the total width dimension Wt thus determined, the protrusions 142 are constituted as a magnetic material in the stator core 52 to satisfy the above-described equation (1). The total width dimension Wt refers to a circumferential dimension of a portion in which the relative permeability may be larger than 1 in one pole. Further, in order to satisfy a dimensional margin, the total width dimension Wt may be set as a width dimension in the circumferential direction of the protrusions 142 for one pole, Specifically, since the number of protrusions for one pole of the magnet portion 42 is "the number of phases×Q", the width dimension in the circumferential direction of the protrusions 142 for one pole (total width dimension Wt) may be set using a relationship "the number of phases×Q×A=3×2×A=6A".

Note that distributed winding refers to a configuration in which one pole pair of the stator winding 51 is present in a period corresponding to one pole pair (N pole and S pole) of the magnetic pole. Here, the one pole pair of the stator winding 51 is configured of two pairs of the linear portion 83 and the turn portion 84 electrically connected at the turn portion 84 in which current flows in mutually opposite directions. As long as the above-described condition is satisfied, a short pitch winding or a full pitch winding may be utilized as equivalents of the distributed winding.

Next, an example of a concentrated winding will be described. The concentrated winding is configured such that a width of one pole pair of the magnetic pole is different from a width of one pole pair of the stator winding. As an example of the concentrated winding, configurations such as three conductor groups 81 for one magnetic pole pair, three conductor groups 81 for two pairs of magnetic poles, nine conductor groups 81 for four pairs of magnetic poles, and nine conductor groups 81 for five pairs of magnetic poles 81 are possible.

Here, in the case where the stator winding is configured as a concentrated winding, two phases of the stator winding 51 are excited when the three-phase windings of the stator winding 51 are successively energized with a predetermined order. As a result, the protrusions 142 for two phases are excited. Hence, the width dimension Wt in the circumferential direction of the protrusion 142 excited by energization of the stator winding 51 in a range corresponding to one pole of the magnet portion is "A×2". Then, under the width dimension Wt thus determined, the protrusion 142 is constituted as a magnetic material to satisfy the above-described equation (1). In the case of the above-described concentrated winding, the total width of the protrusions 142 in the circumferential direction of the stator 50 in a region surrounded by the conductor groups 81 in the same phase is defined as A. Further, the factor Wm in the concentrated winding corresponds to "entire periphery of a surface facing the air gap of the magnet portion 42"×"the number of phases"/"the number of distributions".

For the magnets having the BH product which is larger than or equal to 20 [MGOe (kJ/m$^3$)] such as neodymium magnets, samarium cobalt magnets and ferrite magnets, Bd=1.0 or larger [T], or for the iron, Br=2.0 [T] or larger. Accordingly, for a high-output motor, magnetic material satisfying a relation Wt<½×Wm may be used for the protrusion 142 in the stator core 52.

Further, as will be describe later, in the case where the conductor 82 includes an outer layer film 182, the conductor 82 may be arranged on the stator core 52 in the circumferential direction such that the outer layer films of the conductors 82 are contacted with each other. In this case, Wt is regarded as 0 or a thickness of the outer layer film of both conductors 82 which are contacted with each other.

The configurations shown in FIGS. 28 and 29 include a smaller inter-conductor member (protrusion 142) which is not suitable for the magnet flux in the rotor 40 side. Note that the rotor 40 is configured as a surface magnet type rotor having low inductance and flat shape, and having no magnetoresistive saliency. According to the configuration, the inductance in the stator 50 is reduced and a magnetic distortion caused by shifting of the switch timing of the stator winding 51 is reduced. Moreover, electrolytic corrosion of the bearings 21 and 22 is suppressed.

Other Modifications

Modifications other than the above-described modification will be described as follows.

A distance DM in the radial direction between a radially armature side surface of the magnet portion 42 and the axial center of the rotor may be 50 mm or more. Specifically, for example, a distance DM in the radial direction between a radially inner surface of the magnet portion 42 (i.e. first and second magnets 91, 92) and the axial center of the rotor 40 may be 50 mm or more.

As a rotary electric machine having slot-less structure, smaller sized devices used for models which require output of several tens of watts or several hundreds of watts are known. In this respect, the inventors of the present disclosure are uncertain if there are cases where a slot-less structure has been adopted for a large sized industrial rotary electric machine requiring 10 kW or more. The inventors of the present disclosure studied the reason as follows.

Recently, major rotary electric machines are divided into four types. These rotary electric machines are a brush motor, a squirrel-cage induction motor, a permanent magnet type synchronous motor and a reluctance motor.

A brush motor is supplied with an excitation current via a brush. Hence, for a large-sized brush motor, the brush size becomes larger and maintenance becomes complicated. For this reason, brush motors have been replaced by brush-less motors such as induction motors along with significant developments in semiconductor technology. On the other hand, in the field of small sized motors, various core-less motors have been supplied to the market because of their advantages such as low inertia and economic efficiency.

In a squirrel-cage induction motor, the magnetic field produced in the primary side stator winding is received by the iron core of the secondary side rotor to allow a high density of induction current to flow at the squirrel-cage conductor forming a reaction magnetic field, thereby generating torque. Hence, removing the iron core from both stator side and rotor side is not necessarily a better choice for achieving downsized and highly efficient apparatus.

The reluctance motor utilizes reluctance change of the iron core. Hence, theoretically, it is not preferable to remove the iron core.

For the permanent magnet synchronous motor, IPM motors (interior permanent magnet motors) have been utilized as a major type. Especially for a large sized motor, an IPM motor is often utilized unless special circumstances are present.

The IPM has characteristics having both of the magnet torque and the reluctance torque, and is operated with inverter control in which ratio between torques is appropriately adjusted. Hence, IPM motors can be configured to have a small sized body and excellent controllability.

Figure 30:
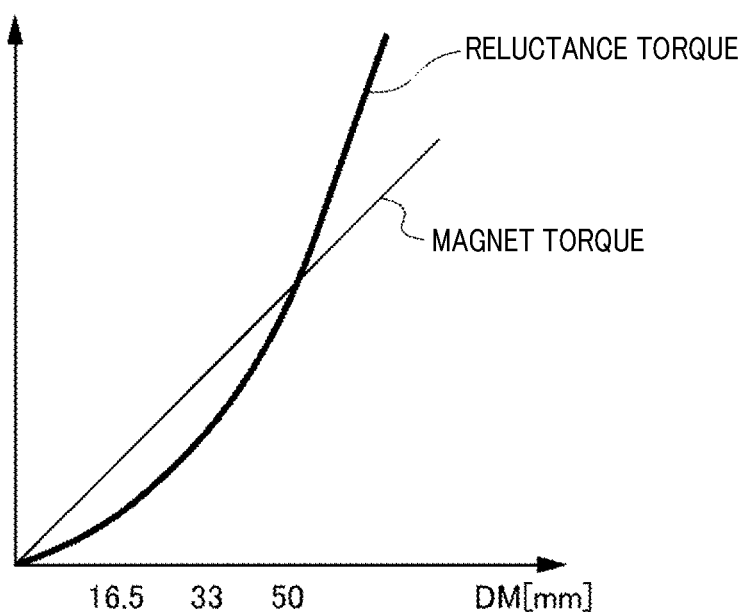
FIG. 30 is an overall diagram showing an example of a change in a magnetic torque and a reluctance torque relative to a radius of a general inner-rotor stator core.

According to the investigation of the inventors of the present disclosure, torque characteristics have been realized. Specifically, a torque of the rotor surface producing the magnet torque and the reluctance torque is depicted in FIG. 30, where the horizontal axis is a distance DM in the radial direction between a radially armature side surface of the magnet portion and the axial center of the rotor, that is, the radius of the stator core of a general inner rotor type.

As shown in the following equation (2), the magnetic field strength produced by the permanent magnet determines the potential of the magnet torque. In contrast, as shown in the following equation (3), for the reluctance torque, the inductance, that is, an amount of q-axis inductance, determines the potential of the reluctance torque. In the following equations (2) and (3), IP is an amount of magnetic flux of the permanent magnet, Iq is a q-axis current, Id is a d-axis current, Lq is a q-axis inductance of the winding, Ld is a d-axis inductance of the winding, and k is a constant.

$$\text{magnet torque} = k \cdot \psi \cdot Iq \quad (2)$$

$$\text{reluctance torque} = k \cdot (Lq - Ld) \cdot Iq \cdot Id \quad (3)$$

Here, the magnetic field strength of the permanent magnet and an amount of q-axis inductance Lq are compared with the magnet diameter DM. The magnetic field strength of the permanent magnet, that is, the magnetic flux ψ, is proportional to the total area of the permanent magnet of the surface opposite to the stator. In the case of a rotor having a cylindrical shape, the magnetic flux ψ is proportional to the surface area of the cylinder. Strictly speaking, since a N pole and S pole are present, it is proportional to half of the occupied area of the cylinder surface. The surface area of the cylinder is proportional to the radius of the cylinder and the length of the cylinder. In other words, as long as the cylinder length is constant, it is proportional to the radius of the cylinder.

Figure 31:
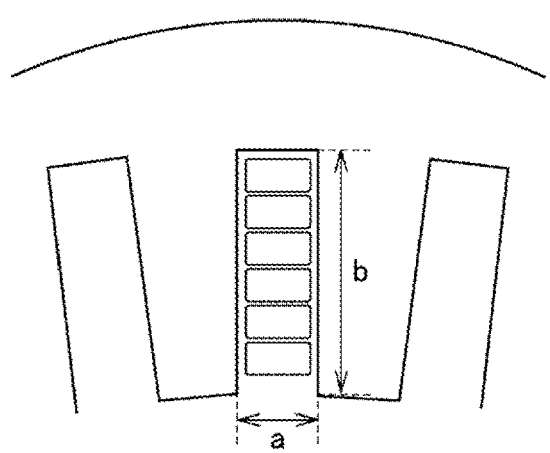
FIG. 31 is an overall diagram showing an example of a slot of a large diameter stator.

On the other hand, q-axis inductance Lq of the winding depends on the shape of the iron core, but the sensitivity thereof is low. Since the q-axis inductance Lq of the winding is proportional to the square of the number of turns of windings, the q-axis inductance Lq of the winding greatly depends on the number of windings. In the case where μ is permeability, N is the number turns of windings, S is cross sectional area of the magnetic circuit, and σ is effective length of the magnetic circuit, the inductance L is expressed by L=μ·N2×S/σ. Since the number of turns of the winding depends on the size of the winding space, if it is the cylindrical type motor, the number of turns of the windings depends on the winding space of the stator, that is, the area of the slots. As shown in FIG. 31, since the shape of the slot is approximately rectangular, the slot area is proportional to a product a×b where a is the length dimension in the circumferential direction and b is the length dimension in the radial direction.

The length dimension of the slot in the circumferential direction becomes larger as the diameter of the cylinder becomes larger. Hence, the length dimension of the slot in the circumferential direction is proportional to the diameter of the cylinder. The length dimension of the slot in the radial direction is proportional to the diameter of the cylinder. In other words, the slot area is proportional to the square of the diameter of the cylinder. As stated in the above-equation (3), since the reluctance torque is proportional to the square of the stator current, the performance of the rotary electric machine is determined depending on how large a current can flow, and the performance depends on the slow area of the stator. As described, when the length of the cylinder is constant, the reluctance torque is proportional to the square of the diameter of the cylinder. Following this result, FIG. 30 shows the relationship between the magnet torque, the reluctance torque and DM.

As shown in FIG. 30, the magnet torque linearly increases with respect to the magnet diameter DM and the reluctance torque increases as a quadratic function. The magnetic torque is dominant when DM is relatively low, and the reluctance torque is dominant when the radius of the stator core becomes larger. The inventors of the present disclosure reached the following conclusion. The intersection between the magnetic torque and the reluctance torque is close to where the stator core radius=50 mm under a predetermined condition. Specifically, for a large sized output motor having 10 kW output in which the stator core radius exceeds 50 mm, it is difficult to remove the iron core because reluctance torque is utilized as mainstream nowadays. This may be one of the reasons why the slot-less structure is not adopted in a field of large sized machines.

In order to improve the torque in a large sized machine having a slot-less structure, a large number of magnetic poles of the rotor such as 32 poles or 48 poles may be utilized. In this case, although windings having the number of turns similar to that of the conventional machine are applied to the rotor having such a number of magnetic poles, the rotor is able to rotate at the desired torque even with a low current. Hence, power consumption by the machine can be reduced.

However, in the rotary electric machine provided with windings having the number of turns similar to that of the conventional machine, the induced voltage to the windings becomes excessive. Accordingly, such a rotary electric machine is unable to operate with conventional power source equipment.

In this regard, it is conceivable that the number of turns of the windings in the slot-less structure may be set to be smaller and the machine be driven with an amount of current similar to that of the conventional machine, thereby saving power. However, when setting the number of turns of the windings in the slot-less structure to be smaller, the inductance of the windings is significantly lowered, and the time constant of the windings becomes too small to stably operate a brush-less motor in which current feedback is required in the switching control.

According to a rotary electric machine in which an iron core is used for the stator, magnetic saturation may occur at the iron core. In particular, in a radial gap type rotary electric machine, a vertical cross-sectional shape is a fan shape for one pole, the width of the magnetic path becomes narrower towards the inner periphery side of the machine, and the performance of the rotary electric machine is limited by the inner periphery side dimension of the teeth portion forming the slots. Even when a high-performance permanent magnet is used, if magnetic saturation occurs at this portion, the performance of the permanent magnet is not sufficiently used. In order to avoid magnetic saturation at this portion, the inner diameter should be designed to be larger. However, as a result, the size of the machine becomes larger.

For example, according to a rotary electric machine with a distributed winding, when three-phase winding is utilized, the magnetic flux flows through three to six teeth per one magnetic pole. However, since the magnetic flux tends to concentrate on tooth portions in a circumferential front side, the magnetic flux does not flow through three to six teeth equally. In this case, a position of the teeth which are magnetically saturated moves in the circumferential direction with rotation of the rotor, while the magnetic flux concentratedly flows through a part of the teeth (e.g. one or two teeth). This may be a cause of a slot ripple phenomenon.

As described, according to the rotary electric machine of the slot-less structure in which the magnet diameter DM is larger than or equal to 50 mm (corresponding to an outermost diameter of 100 mm or more), tooth portions may preferably be removed in order to avoid magnetic saturation. However, when the tooth portions are removed, the magnetic resistance of the magnetic circuit in the rotor and the stator increases and the torque of the rotary electric machine is decreased. As a reason for an increase in the magnetic resistance, for example, an increase in the air gap between the rotor and the stator may be considered. Hence, according to the rotary electric machine of the slot-less structure, the torque is required to be further enhanced. Therefore, there is a significant advantage in applying the above-described configuration capable of enhancing the torque to the above-described rotary electric machine of a slot-less structure having a magnet diameter DM of 50 mm or larger.

For a rotary electric machine having an inner rotor structure instead of an outer rotor type rotary electric machine, the distance DM in the radial direction between a surface in the armature side of the magnet portion and the axial center of the rotor may be larger than or equal to 50 mm.

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

CONCLUSION

As described, the present disclosure provides, as a first aspect, a control apparatus of a rotary electric machine including a rotor; a stator disposed co-axially with the rotor, the stator including a multiphase stator winding provided with conductor portions arranged in positions facing the rotor at predetermined intervals in a circumferential direction thereof. The rotary electric machine is provided with any one of the following configurations: a first configuration having a first inter-conductor member using a magnetic material; a second configuration having a second inter-conductor member using a non-magnetic material; and a third configuration having no inter-conductor member. The control apparatus includes: a drive circuit connected to the multiphase stator winding of the rotary electric machine, including controlling an energization state, provided for each of a corresponding one of a plurality of phases, the drive circuit supplying power to the multiphase stator winding by operating the pair of switching elements; and a control unit that controls the drive circuit such that a period where a conduction ratio of the pair of switching elements for one phase in the drive circuit is maintained at a constant value, is a predetermined period larger than or equal to 120 degrees and less than 180 degrees in electrical angle.

According to the first aspect of the present disclosure, stable rotation control is obtained in a rotary electric machine having a toothless winding. In the control of the first aspect, since a predetermined conduction ratio is used for the control without using successive control of the current value, current detection is unnecessary. Hence, a low-cost control apparatus for a toothless motor can be provided.

What is claimed is:

1. A control apparatus for a rotary electric machine, the rotary electric machine comprising:
    a rotor;
    a stator disposed co-axially with the rotor, the stator including a multiphase stator winding provided with conductor portions arranged in positions facing the rotor at predetermined intervals in a circumferential direction thereof; and
    any one of,
        a first configuration having a first inter-conductor member between respective conductor portions in the circumferential direction, the first inter-conductor member using a magnetic material in which a saturation magnetic flux Bs satisfies a relationship of Wt×Bs Wm×BR, where Wt is a width dimension in the circumferential direction of a portion between respective conductor portions corresponding to one magnetic pole of a magnet portion of the rotor, Wm is a width dimension in the circumferential direction corresponding to the one magnetic pole, and Br is a residual magnetic flux density of the magnet portion,
        a second configuration having a second inter-conductor member between respective conductor portions in the circumferential direction, the second inter-conductor member using a non-magnetic material, and
        a third configuration having no inter-conductor member,
    wherein the control apparatus comprises:
        a drive circuit connected to the multiphase stator winding of the rotary electric machine, including a pair of switching elements controlling an energization state, provided for each of a corresponding one of a plurality of phases, the drive circuit supplying power to the multiphase stator winding by operating the pair of switching elements; and
        a control unit configured to:
            control the drive circuit such that a period where a conduction ratio of the pair of switching elements for one phase in the drive circuit is maintained at a constant value is a predetermined period greater than or equal to 120 degrees and less than 180 degrees in electrical angle, wherein
            the pair of switching elements is configured as a pair of an upper switching element and a lower switching element in which one switching element is connected to a high voltage side and the other switching element is connected to a low voltage side;
            gradually change the conduction ratio of the pair of the upper switching element and the lower switching element from a conduction ratio of a balanced state in which an average current of the stator winding is zero to the constant value;
            set a period, at each 180 degrees, including the predetermined period and the period where the conduction ratio is gradually changed;
            complementarily set, in a first period, conductivities of the upper switching element and the lower switching element; and
            set, in a second period subsequent to the first period, the conduction ratio of the upper switching element to be the conduction ratio of the lower switching element in the first period and the conduction ratio of the lower switching element to be the conduction ratio of the upper switching element in the first period.

2. The control apparatus of the rotary electric machine according to claim 1, wherein
the control unit includes a reference table storing the conduction ratio and the predetermined period with respect to a torque command value or a current command value; and
the control unit is configured to control the constant value of the conduction ratio and a length of the predetermined period in accordance with the torque command value or the current command value.

3. The control apparatus of the rotary electric machine according to claim 1, wherein
a voltage adjusting unit is disposed between the drive circuit and a power source that supplies DC power to the drive circuit; and
the control unit is configured to set the constant value of the conduction ratio to be 100% and adjust an output voltage of the voltage adjusting unit to control a current value of a current flowing through the stator winding.

4. The control apparatus of the rotary electric machine according to claim 3, wherein
the control unit includes a reference table storing a voltage value with respect to a torque command value or a current command value which are set for each predetermined rotational speed; and
the control unit is configured to adjust a voltage outputted by the voltage adjusting unit based on the reference table.

5. The control apparatus of the rotary electric machine according to claim 1, wherein
a temperature detecting unit is provided to detect a temperature of the stator winding; and
the control unit is configured to lower, when the detected temperature is greater than or equal to a threshold, at least one of the constant value of the conduction ratio and the predetermined period, compared to a case where the detected temperature is less than the threshold.

6. The control apparatus of the rotary electric machine according to claim 1, wherein
a position detecting unit is provided to detect a magnetic pole position of the rotor; and
the control apparatus is configured to determine a period starting point and a period ending point of the predetermined period depending on the detected magnetic pole position.

7. The control apparatus of the rotary electric machine according to claim 1, wherein
the stator is disposed at an inner peripheral side of the rotor;
a supporting member that supports the stator winding is provided, the supporting member being configured as a cylinder having a hollow portion inside thereof; and
the control unit is incorporated in the hollow portion via a heat dissipation member.

8. The control apparatus of the rotary electric machine according to claim 1, wherein
the rotor is configured as a surface magnet type rotor in which a permanent magnet is disposed on a surface facing the stator.

9. The control apparatus of the rotary electric machine according to claim 8, wherein
the permanent magnet is configured to have a polar anisotropic orientation.

10. The control apparatus of the rotary electric machine according to claim 1, wherein
the stator winding is formed such that a strand assembly, in which a plurality of strands as a conductor are twisted, is covered by an insulation member.

11. The control apparatus of the rotary electric machine according to claim 1, wherein
the rotary electric machine has an outermost diameter of 100 mm or more.

12. A control method for a rotary electric machine, the rotary electric machine comprising:
a rotor;
a stator disposed co-axially with the rotor, the stator including a multiphase stator winding provided with conductor portions arranged in positions facing the rotor at predetermined intervals in a circumferential direction thereof; and
any one of,
a first configuration having a first inter-conductor member between respective conductor portions in the circumferential direction, the first inter-conductor member using a magnetic material in which a saturation magnetic flux Bs satisfies a relationship of Wt×Bs Wm×BR, where Wt is a width dimension in the circumferential direction of a portion between respective conductor portions corresponding to one magnetic pole of a magnet portion of the rotor, Wm is a width dimension in the circumferential direction corresponding to the one pole, Br is a residual magnetic flux density of the magnet portion,
a second configuration having a second inter-conductor member between respective conductor portions in the circumferential direction, the second inter-conductor member using a non-magnetic material, and
a third configuration having no inter-conductor member,
wherein the control method comprises:
controlling a drive circuit connected to the multiphase stator winding of the rotary electric machine including a pair of switching elements controlling an energization state, provided for each of a corresponding one of a plurality of phases,
the drive circuit supplying power to the multiphase stator winding by operating the pair of switching elements, such that a period where a conduction ratio of the pair of switching elements for one phase in the drive circuit is maintained at a constant value is set to be a predetermined period which is greater than or equal to 120 degrees and less than 180 degrees in electrical angle, and
the pair of switching elements being configured as a pair of an upper switching element and a lower switching element in which one switching element is connected to a high voltage side and the other switching element is connected to a low voltage side;
gradually changing the conduction ratio of the pair of the upper switching element and the lower switching element from a conduction ratio of a balanced state in which an average current of the stator winding is zero to the constant value;
setting a period, at each 180 degrees, including the predetermined period and the period where the conduction ratio is gradually changed;
complementarily setting, in a first period, conductivities of the upper switching element and the lower switching element; and setting, in a second period subsequent to the first period, the conduction ratio of the upper switching element to be the conduction ratio of the lower switching element in the first period and the conduction ratio of the lower switching element to be the conduction ratio of the upper switching element in the first period.

13. The control method of the rotary electric machine according to claim 12, wherein
the rotary electric machine has an outermost diameter of 100 mm or more.

* * * * *